(12) United States Patent
Kewitsch

(10) Patent No.: US 7,315,681 B2
(45) Date of Patent: Jan. 1, 2008

(54) FIBER OPTIC ROTARY COUPLING AND DEVICES

(76) Inventor: Anthony Kewitsch, 515 Ocean Ave., Unit 505-South, Santa Monica, CA (US) 90402

( * ) Notice: Subject to any disclaimer, the term of this patent is extended or adjusted under 35 U.S.C. 154(b) by 8 days.

(21) Appl. No.: 11/161,584

(22) Filed: Aug. 9, 2005

(65) Prior Publication Data

US 2007/0036506 A1 Feb. 15, 2007

Related U.S. Application Data

(60) Provisional application No. 60/638,569, filed on Dec. 22, 2004, provisional application No. 60/599,964, filed on Aug. 9, 2004.

(51) Int. Cl.
*G02B 6/00* (2006.01)
(52) U.S. Cl. .................................................... 385/135
(58) Field of Classification Search ...................... None
See application file for complete search history.

(56) References Cited

U.S. PATENT DOCUMENTS

| 5,078,466 A | * | 1/1992 | MacCulloch | 385/26 |
| 6,328,243 B1 | * | 12/2001 | Yamamoto | 242/378.1 |
| 6,484,958 B1 | * | 11/2002 | Xue et al. | 242/378.1 |

* cited by examiner

*Primary Examiner*—Sung Pak
*Assistant Examiner*—Hoang Tran
(74) *Attorney, Agent, or Firm*—Raymond A. Bogucki

(57) ABSTRACT

In this invention, a fiber optic rotary joint and applications of such to retractable fiber optic cables is described. The fiber optic rotary joint consists of a spiral arrangement of a spring and optical fiber pair placed between rotating inner and outer diameters. The fiber optic rotary joint provides a finite number of turns of a fiber optic cable about a primary axis. These turns can be used, for example, with a rotating spool to provide a continuous retractable and extendable cable.

22 Claims, 16 Drawing Sheets

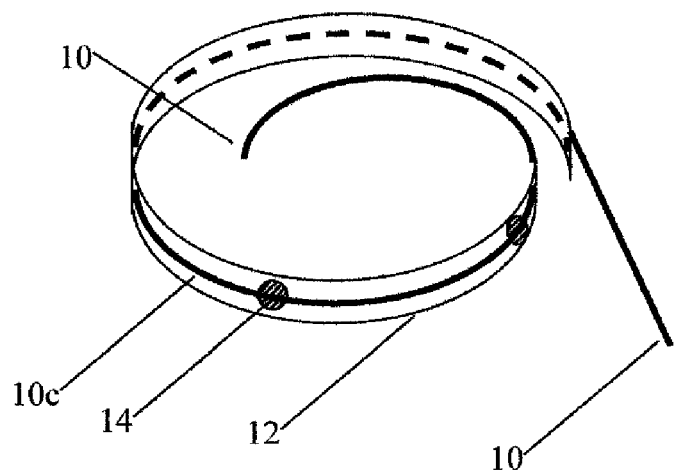
FIG. 5A
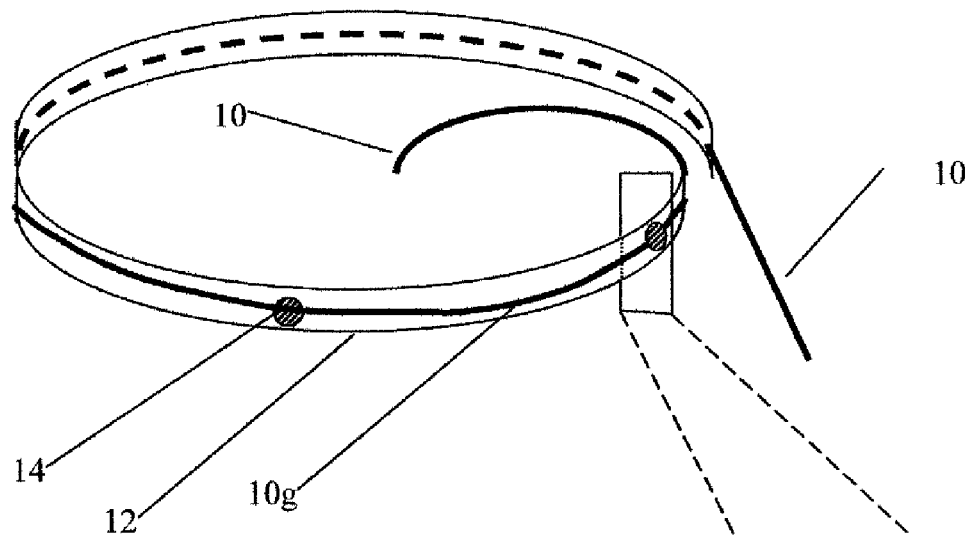
FIG. 5B
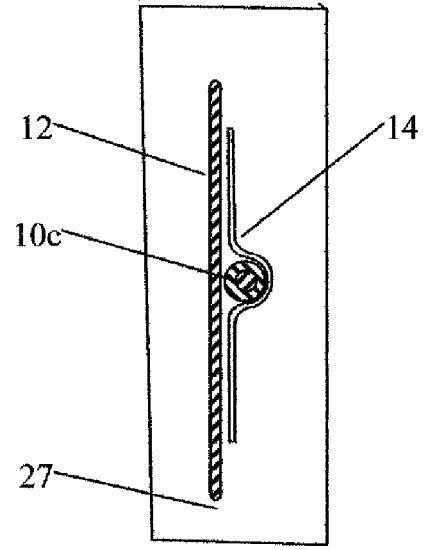

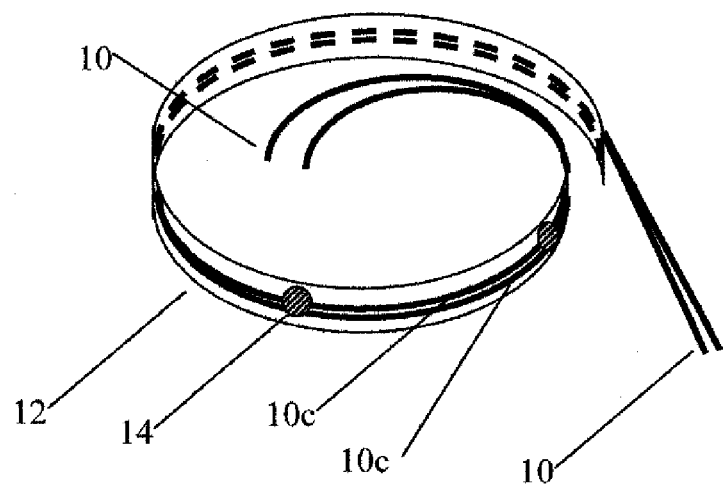
FIG. 6A
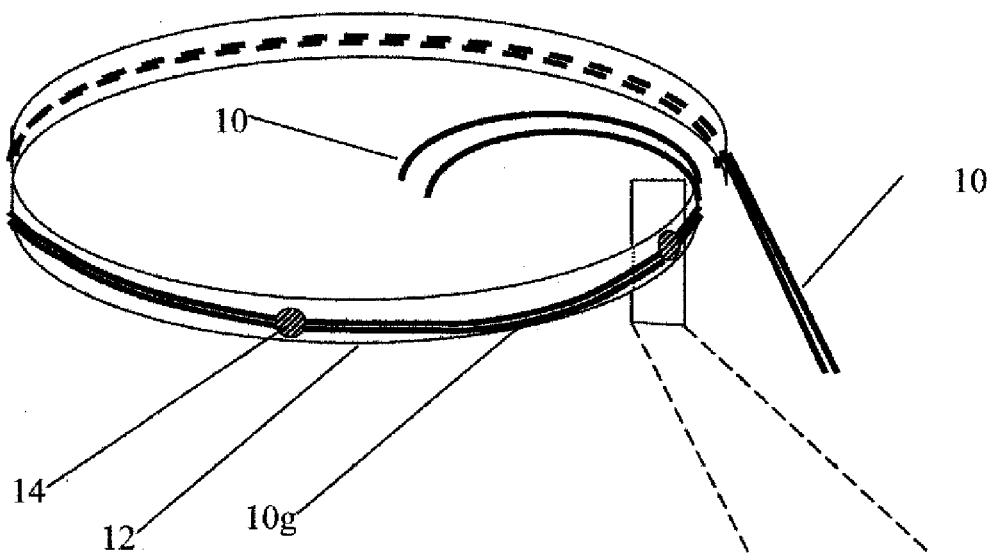
FIG. 6B
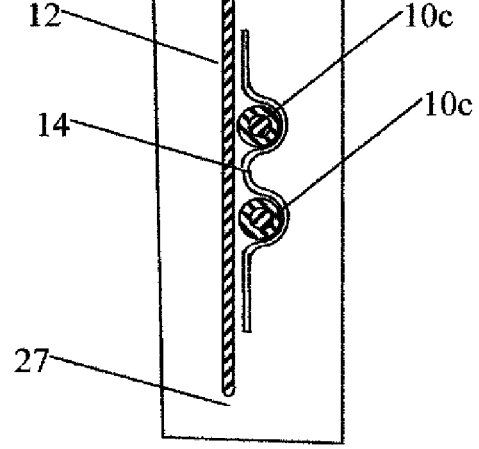

FIBER OPTIC ROTARY COUPLING AND DEVICES

REFERENCE TO RELATED APPLICATIONS

This application relies for priority on provisional application 60/599,964 of Anthony Kewitsch, filed on Aug. 9, 2004 and entitled "Retractable Fiber optic Devices," and provisional application Ser. No. 60/638,569 filed on Dec. 22, 2004 and entitled "Fiberoptic Rotary Coupling and Devices."

FIELD OF THE INVENTION

This invention relates to optical systems using fiber optic cables to transmit illumination and/or signals, and more particularly to devices and methods to enable the rotation of opposite ends of a fiber optic cable relative to one another, and further providing a compact means of retracting fiber optic cables.

BACKGROUND OF THE INVENTION

The development of improved techniques to manage excess lengths of fiber optic cabling has become particularly relevant with the spread of optical communications technology from the long haul and metro networks to the interconnection rich enterprise and access networks. A unique characteristic of fiber-based transmission media is that considerable care must be taken in handling fiber optic cables because of the potential to damage the internal glass optical fiber. Unlike electrical cables, which can be sharply bent or subjected to significant forces without impacting their performance characteristics, fiber optic cables can easily be damaged under small shear forces and must maintain a minimum bend radius. Sharp bends result in increased insertion loss, stress birefringence (manifested as polarization dependent loss), and ultimately fiber failure. In addition, the interface between the polished fiber optic connector and cable is particularly sensitive to damage arising from the concentration of stress at the connector interface and the weight of the connector body.

The preparation of fiber optic patchcords requires the use of a complex and time consuming polishing process which adds considerable cost relative to electronic cabling. Optical fiber cables can not be readily cut to length in the field, nor can they be simply folded to take up excess length. Unlike electrical connectors, optical connectors are highly sensitive to damage arising from contamination or scratching. This damage results in potential data corruption or complete loss of data transmission. Therefore, techniques to mitigate damage to fiber optic cables address an important problem.

Early attempts to provide optical systems with retractable fiber optic cables, that is, cables wherein excess lengths are automatically wound onto a spool, have been unsuccessful because of the high cost and complexity of the proposed solutions. For instance, the design of communications interfaces with retractable fiber optic cables has been described in U.S. Pat. No. 6,014,713 by Agnew et al. and U.S. Patent Application 2004/0081404 by Elliott et al. Both devices involve a retraction unit in which one cable end is fixed in location, while the other cable end is extendable/retractable. A significant disadvantage of these approaches is that the fiber optic cable is physically interrupted. A collimator pair comprising a rotary junction allows one cable to rotate relative to the other and results in considerable complexity and excessive cost. In particular, the rotatable spool includes a terminated and lensed fiber interface which must remain in precise alignment with a reciprocal, fixed lensed fiber interface to achieve optical continuity.

Various patents describe a wide range of fiber optic rotary joints and slip rings, wherein the optical fiber is cut and lenses and/or optics are placed in alignment to transmit signals or illumination across the rotary interface. U.S. Pat. Nos. 4,109,998, 4,124,272, 4,258,976, 4,447,114, 4,641,915, 4,749,249, 4,872,737, 5,371,814, 5,450,509, 5,442,721, 5,921,497, 6,301,405, 6,453,088, 6,799,878, and Patent Application US 2004/0086222 present different versions of this concept. Significant complexity is added for a rotary interface in which multiple fibers must remain in communication.

In an alternate approach, U.S. Pat. Nos. 5,078,466 and 6,819,854 describe a fiber optic rotary joint comprised of a flexible ribbon cable joining rotating and stationary parts of a structure. These approaches do not address the unique requirements of a low loss fiber optic rotary interface, which requires that a gradual fiber bend radius be maintained. In particular, the combination of friction between cable surfaces and lack of transverse rigidity of fiber is significant enough to severely limit the amount of angular rotation that can be produced while maintaining a minimum bend radius. Adjacent turns bind once they are tightly packed about the inner or outer diameter (corresponding to the wound or unwound configurations). Therefore, this approach is inadequate to prevent binding and to provide a substantial number of rotations in a low loss manner.

An alternate retractable fiber optic cable approach (U.S. Patent Application 2004/0170369) by Pons utilizes a continuous length of fiber which is wound pair-wise about a spool. This approach suffers from the limitation that both fibers must be retracted or extended together. In most applications, it is preferred that one end of the fiber is of fixed length, while the other end is continuously extendable.

Significant optical network performance and cost advantages are derived by the ability to retract a variable length of un-interrupted optical fiber cable in a convenient and cost effective manner. To further maintain low loss and low backreflection, it is important that the retraction approach does not physically interrupt or cut the cable. Furthermore, the rotary interface design must provide in excess of a few turns to enable significant cable lengths to be retracted within a compact housing.

SUMMARY OF THE INVENTION

It is an object of the present invention to provide a fiber optic rotary unit comprised of one or more continuous lengths of optical fiber and to provide a retractable, coiled fiber optic cable assembly including the rotary unit therein. The retractable cable assembly protects excess lengths of fiber optic cable in a low loss and convenient fashion. This cable may be of the simplex, duplex, or ribbon cable type, for example. A central point on the cable is rigidly attached to the reel and this point rotates as the cable is retracted or extended to controllable lengths. The spool rotates about a central shaft, under the force of a power spring which transfers a torsion force adequate to wind the extended fiber optic cable onto the rotating reel. The reel incorporates a hub with notched segments on its periphery to engage a force balanced, spring loaded ratchet-pawl mechanism. This mechanism permits smooth cable extension throughout the entire range of fiber extension and securely locks the reel to maintain the fiber optic cable at the desired length.

The fiber optic cable is attached to the rotating reel and maintains optical and physical continuity as the same fiber enters the rotary interface. The rotary interface consists of a spiral spring-optical fiber combination which accommodates winding or unwinding of the optical fiber in a low loss fashion. The spring provides rigidity and reduced friction such that winding and unwinding of a substantial number of turns is accomplished without subjecting the fiber to excessive bends. The fiber optic cable exits the fixed end of the rotary interface which is attached to an enclosure.

The functionality of a wide range of fiber optic devices is enhanced by incorporating the retractable fiber interface disclosed herein. Optical components such as splitters, filters, attenuators, isolators, circulators, mode conditioning devices, detectors, switches, attenuators, lasers, transceivers, receivers, and amplifiers in combination with electronics may be integrated with the unit. For example, a tap photodetector and electronics may be incorporated into the reel housing to provide a readout of the optical signal strength within the fiber optic cable. These and other objectives of the present invention will become apparent to those of ordinary skill in the art after having read the following detailed description of the preferred embodiments illustrated in the various drawings.

BRIEF DESCRIPTION OF THE DRAWINGS

FIG. 5 details a single turn of spiral spring with a single fiber optic strand attached in (5A) wound state and (5B) unwound state;

FIG. 6 details a single turn of spiral spring with two fiber optic strands attached in (6A) wound state and (6B) unwound state;

DETAILED DESCRIPTION OF THE INVENTION

Figure 1A:
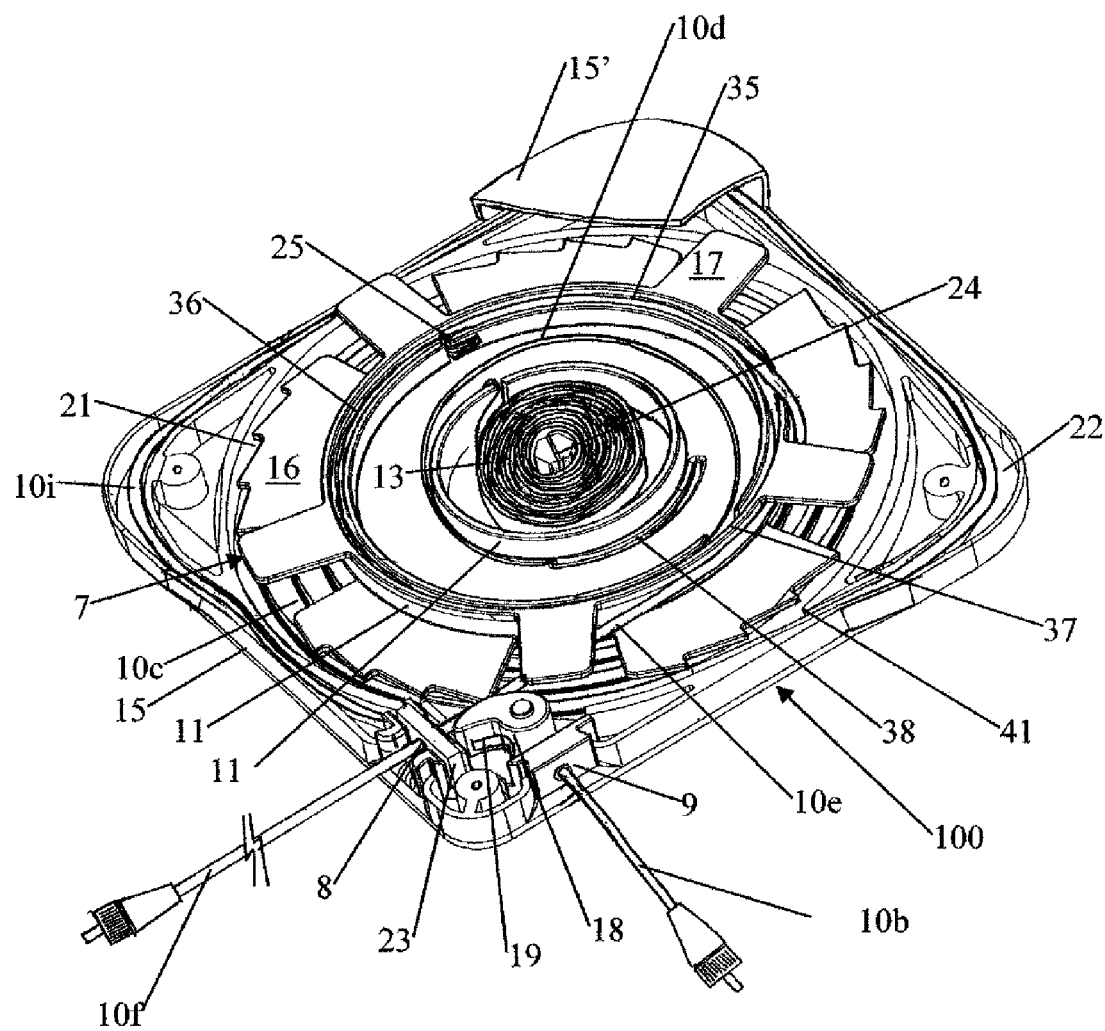
FIG. 1 illustrates a retractable fiber optic unit in the fully extended state, (1A) a cut away view of the assembly with cover substantially removed and (1B) bottom of reel.

In this invention we disclose a retractable fiber optic unit which offers high optical performance in a compact and low cost unit. An overview of the structure and operation is desirable because, even though a minimum number of parts are employed, the fiber paths and the geometry are quite complex and not readily understood without use of an excessive number of drawings. This does not seem necessary if the following is appreciated.

Referring to FIGS. 1 and 2, the expandable/retractable optical fiber cartridge is confined within a lower housing 15 and upper housing 15' which are generally square in plan view, and which have an exit port 9 for a fixed length of cable and a withdrawal or control port 8 for an extractable, returnable length of cable 10. A central shaft 24 is fixed to the housing and encompassed by a helical power spring 13, one end of which is attached to the shaft 24 and the other end of which is attached to a central spool 7 that is rotatable about the central axis of the housing. The spool 7 comprises a first, interior, annulus 11' to which the outer end of the power spring 13 is coupled, and at a greater radial distance, a second annulus 11 which serves as a hub on which a length of jacketed cable can be wound. The jacketed cable 10 wound on the spool 7 is confined vertically (as seen in the Figs. the orientation is of course optional) between a reel cover 17 and a reel body 16, both of which are in planes transverse to the central axis. The reel body 16 and reel cover 17 are spaced apart sufficiently to receive adequate turns of jacketed fiber cable 10 which can range from 0.9 mm to 6 mm in diameter. The movable end of the jacketed fiber cable 10 exits the housing from the control port 8, but when fully retracted is contained almost entirely within the housing about the spool annulus 11. Depending upon design factors, a substantial length of cable (e.g. up to 20 meters in this example) can be retained in the housing 15.

Within the outer annulus 11 on the spool 7, a radially inner length of cable helically extends in a short path about the central axis on the superior side of the reel body 16 to pass through transition port 38 in the reel body 16. The transition port 38 has a curvature to assure that it has no less than the minimum bending radius. This through port 38 passes the fiber between the superior side of the reel body 16 and the inferior side, to exit within an encompassing mandrel 30. The mandrel 30 is also spaced apart from the central axis by a distance greater than the minimum bending radius specified for the fiber. The fiber cable at this region now has a minimal or reduced jacketing diameter in order to conserve space and allow a maximum number of turns in an interleaved spiral cable structure. The fiber diameter, depending upon the configuration, can vary from acrylate coated fiber to tight buffer jacketed fiber, or from about 0.25 mm to about 0.9 mm.

The interleaved spring and cable structure is disposed on the inferior side of the reel body 16, helically wrapped about the mandrel 30 and substantially concentric with the central axis. The interleaved structure comprises coextensive lengths of optical fiber (generally but not necessarily of unjacketed form) attached to and along a spiral torsion spring 12. The spring is attached to the reel at the inner periphery and is attached to the housing at the outer periphery. The spring 12 and fiber 10c have an adequate number of turns (e.g. 33 in this example) to compensate, by expanding or contracting in circumference, for the spool rotation caused by withdrawal of a length of cable from the spool. This approach to compensating for differential rotation maintains optical continuity in the optical cable between the fixed end that leads to the fixed output port and a variable length of extracted cable at the control port 8. In other words, as the spool 7 is spun during withdrawal of optical cable from the spool, the power spring 13 and the interleaved spring/cable section both tighten within limits. On retraction the power spring 13 and the spiral spring both provide both torque and again, length compensation. The interleaved spring/cable combination provides rotation buffering, or differential rotation compensation, with low friction while maintaining continuity to the fixed end of the cable.

To complete the optical circuit at a fixed output terminal, the fiber at the end of the interleaved pair is returned to a jacketed section adjacent the periphery of the housing and the cable is extended through the fixed port to a terminal.

The power spring stores energy to enable automatic retraction upon release of the jacketed cable section. The torque provided by the interleaved spring/cable combination is much less, but it is adequate to limit frictional restraint between the fiber sections as they shift differentially. As will be shown numerous variations can be used in the parts, geometry and fractions of the assembly.

FIG. 1 illustrates a retractable fiber optic unit 100 whose cable is fully extended from the housing. A top view with the enclosure cover 15' substantially cutaway is illustrated in FIG. 1A, detailing the retracted fiber 10e, terminated by a connector at end 10f, fully unwound from an annulus 11 and maintained on the annulus by flanges comprised of reel body or hub 16 and reel cover 17. The length of fiber optic cable 10e remaining in the housing enters the interior side of annulus 11 and transitions to an interior channel 35 to a point 25 wherein the protective fiber optic cable jacket ends and the interior aramid yarn strength member is firmly affixed to the reel. This aramid fiber provides strain relief which prevents the pulling force while retracting the cable from excessively tensioning the bare glass fiber within the core of the cable. Beyond this point, the reduced diameter fiber continues within interior channel 36 until point 37, where the fiber 10d transitions inward along a spiral path into a transition port 38 opening to the bottom surface 39 of the reel.

Figure 1B:
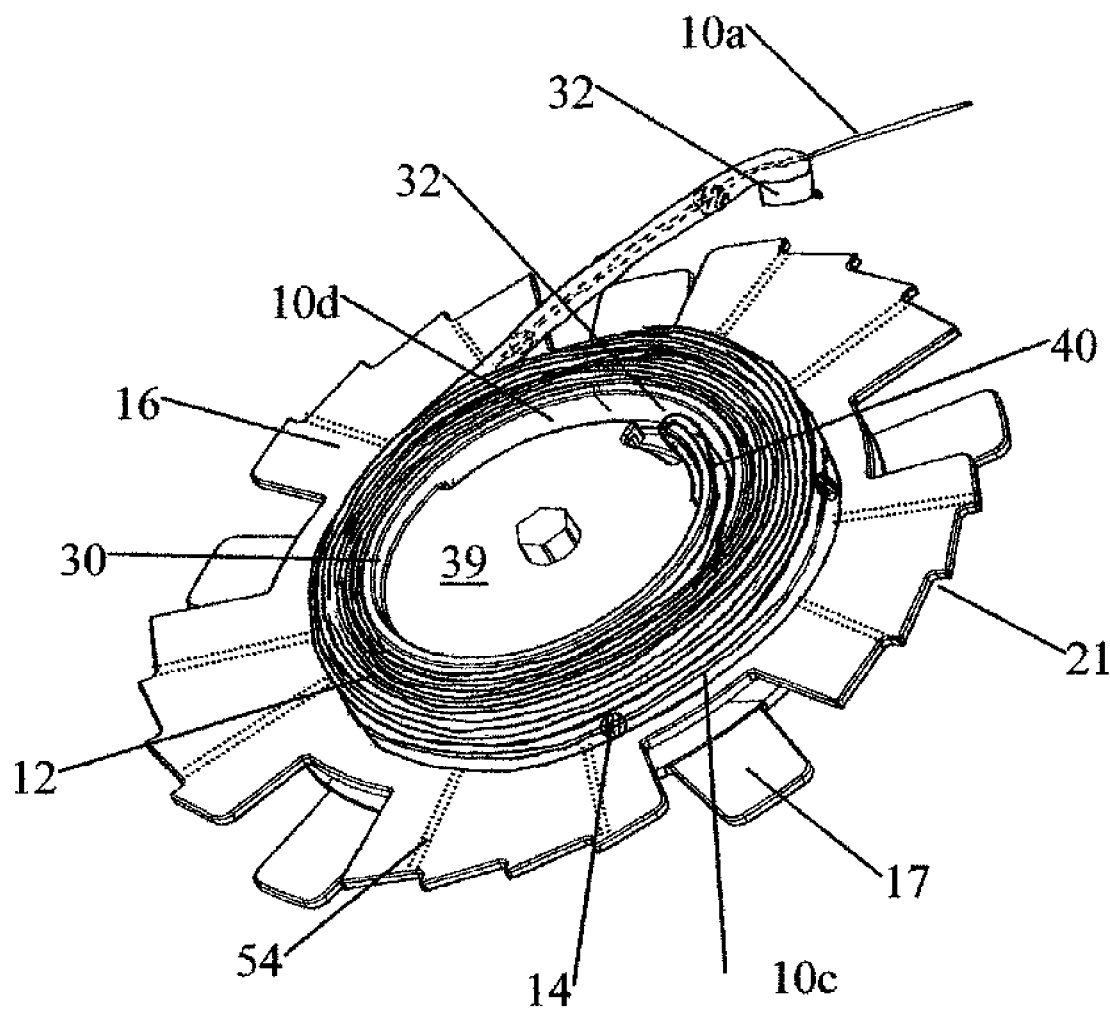

FIG. 1B illustrates a bottom view of reel body 16 and the corresponding location of the transition port 38 through which the fiber 10d has passed. This fiber continues into channel 40, where the spiral spring 12 is attached to the bottom side of the reel at spring clip 32. Within channel 40, the fiber 10c and spring 12 merge into a spiral structure wherein the fiber 10c is periodically attached to the spring. Die cut, skived PTFE (Teflon) self-adhesive disks 14 locally affix the fiber 10c to the spring 12 and reduce friction between adjacent turns of the spring to facilitate free rotation. In addition, the surfaces in contact with the spiral spring; namely, the inner surface of enclosure bottom 15 and surfaces of the reel 16 may advantageously have radially distributed, raised and rounded ridges 54 which serve to reduce the contact area and hence the friction encountered when winding the spiral spring. Similar surface relief may be applied to those surfaces of the reel 16 and enclosure top 15' in contact with the power spring 13. In general, the geometry of this relief should be such that the ridges lie substantially parallel to the radius of curvature of the spring.

A typical implementation utilizes a spiral comprised of 35 complete turns. At the outermost turn of the spiral, the fiber 10c separates from spring 12 at spring clip 32 attached to the enclosure bottom 15 (not shown in FIG. 1B) at location 41. The fiber 10c is re-jacketed with its furcation tube/jacket at 41 and is retained within channel 22 of FIG. 1A, which accommodates a length of the fiber 10b. The fiber 10b follows channel 22 such that it exits the unit 100 at port 9.

Fiber 10f corresponds to the retractable/extendable end of cable. Retractable fiber end 10f passes through a matching hole in a felt cleaning pad 23 which prevents excessive contamination from entering the retraction mechanism and dampens the retraction action. Controllable retraction is accomplished by a ratchet/pawl system. As fiber 10f is pulled from the unit, the fiber 10e can exert a force on pawl 18 adequate to withdraw the pawl from the ratchet notch 21 and initiate rewind, depending on the angle the fiber is withdrawn relative to the housing. A pawl spring 19 maintains the pawl positively engaged with the ratchet notch 21 when the fiber tension is relaxed. Pulling the fiber 10f such that it is withdrawn from the enclosure at an angle sufficient to withdraw pawl 18 from notch 21 enables the reel 16 to freely rotate under the torque of the power spring 13 so that the fiber 10e can be rewound onto the reel 16. The rewind may be inhibited at any point by changing the angle of the fiber 10f entering the retraction unit 100 such that the pawl 18 re-engages the ratchet notch 21.

In this fully extended state (configuration of FIG. 1), the power spring 13 is tightly wound about shaft 24 and the spiral spring 12 is tightly wound about mandrel 30. The fiber optic cable 10c attached to the spiral spring 12 experiences the minimum average radius of curvature in this state. The power spring, being tightly wound, produces its maximum torque on the reel. This torque is typically 5 ounce-inches for a power spring 13 of 0.007 inch thickness, 0.250 inch width, 0.25 inch inner diameter and 1.5 inch outer diameter. The spiral spring 12 of 0.005 inch thickness, 0.250 inch width, 2.1 inch inner diameter and 5.1 inch outer diameter produces a relatively small torque on the reel because of it is relatively thin and because its radius of curvature in the fully wound state is large (>1 inch). The 0.25 mm acrylate coated optical fiber 10c is affixed to the hard tempered, 301 stainless steel spring 12 by use of 0.225 inch diameter, die cut skived PTFE disks 14 comprised of 0.002 inch thick film and 0.0015 inch thick pressure sensitive silicone adhesive. The disks 14 are applied every quarter turn to the spiral spring 12—fiber 10c combination in the fully wound state illustrated in FIG. 1B. It is advantageous to use the stainless steel-silicone adhesive combination because of its superior adhesion properties under high humidity and high temperature.

Figure 2A:
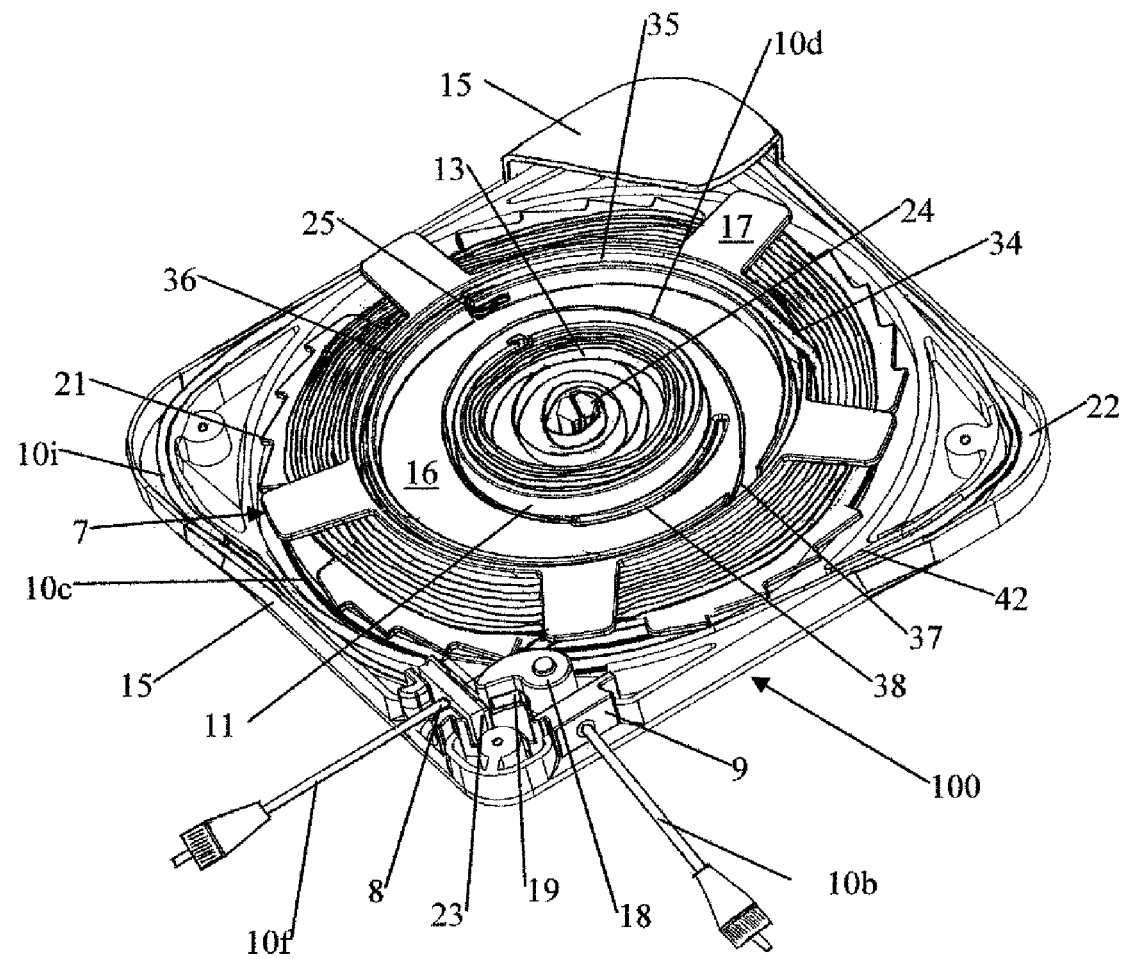
FIG. 2 illustrates a retractable fiber optic unit in the fully retracted state, (2A) a cut away view of the assembly with cover substantially removed and (2B) bottom of reel.

If the fiber is allowed to fully retract into the unit 100, the power spring 13 is significantly unwound and the fiber is fully wound onto mandrel 30. FIG. 2 illustrates a retractable fiber optic unit 100 in this fully retracted state. A top view with the enclosure cover 15' substantially cut away is illustrated in FIG. 2A, detailing the retracted fiber 10e, terminated at end 10f and fully wound about annulus 11. The retracted fiber 10e enters the interior side of annulus 11 at a location 34 serving as the entrance to interior channel 35. At point 25 the fiber optic jacketing tube terminates to reveal the aramid yarn strength member, inner tube and the optical fiber 10d which lies therein. The yarn is affixed to the reel by use of adhesive (epoxy or thermoplastic, for example), which forms an anchor-like mass surrounding and impregnating the yarn at location 25. Beyond this point, the fiber 10d, either bare fiber or tight buffered fiber, continues within interior channel 36 until point 37 wherein fiber 10d transitions inward along a spiral path into a transition port 38. At this location the fiber transitions to the lower surface 39 of the reel.

Figure 2B:
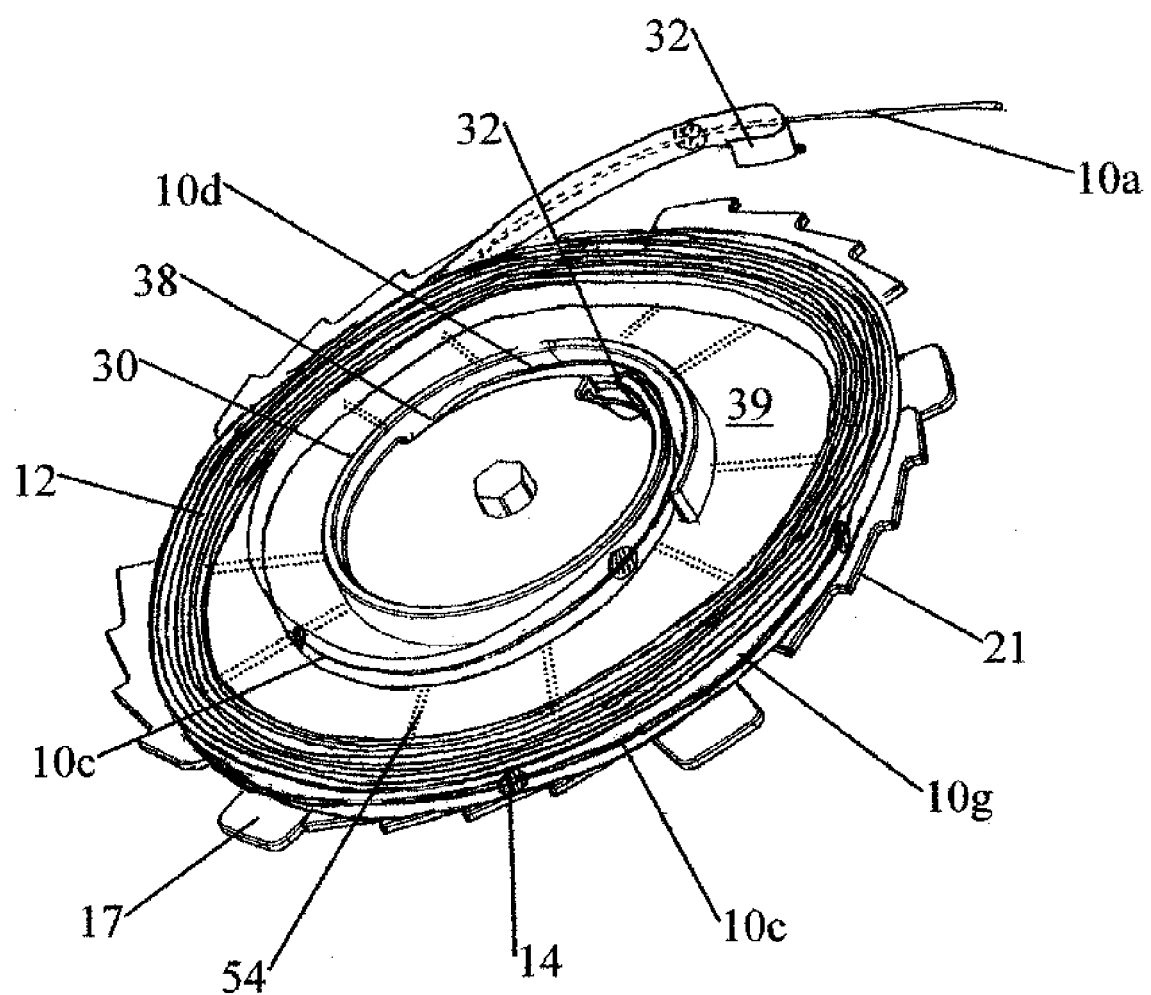

FIG. 2B illustrates a bottom view of reel body 16 and the corresponding location of the transition port 38 through which the fiber 10d transitions into channel 40. The spiral spring 12 is attached to mandrel 30 at spring clip 32 and merges with the fiber within channel 40. The fiber 10c and spring 12 are integrated into a composite structure wherein the spring provides sufficiently rigidity to prevent the fiber 10c from experiencing excessive bending. The composite structure further includes attachment points 14 wherein the fiber 10c is locally affixed to the spring 12. Fiber 10c separates from spring 12 at spring clip 32 attached to the enclosure bottom 15 (not shown in FIG. 2B) at location 41. The fiber 10h is then retained within a channel 22 which serves as an outer spool in which the length of fiber 10e can be retained.

In the fully retracted state illustrated in FIGS. 2A and 2B, the power spring 13 is substantially unwound from the shaft 24, and the spiral spring 12 is substantially unwound from the mandrel 30 such that most of the spring 12 lies near the outer edge of the reel. While not shown in FIG. 2B, these outer spring turns are retained by the mating circular cavity of the enclosure bottom 15. The fiber optic cable 10c attached to the spiral spring 12 experiences the maximum average radius of curvature in this state. As a result, the fiber 10c attached to the spring 12 tends to deflect both within the plane of the spring 12 and to a lesser extent normal to this plane as a result of a buckling phenomenon. The location of the deflected fiber is visible at fiber location 10g in FIG. 2B. The use of a non-continuous attachment of the fiber 10c to the spring 12 is a key requirement to provide robust, low stress and optically low loss winding and unwinding of the spiral.

In the fully retracted state, the power spring, being partially unwound, produces a reduced torque on the reel. The minimum torque is typically 50% to 75% of the original 5 ounce-inch maximum torque when fully wound.

Various types of protective jacketing can be incorporated into the cable retraction unit, such as jacketed fiber of 3, 2.9, 2, or 1.6 mm outer diameter, loose tube or tight buffer of 0.9 mm outer diameter, or one of the various types of multi-strand fiber cabling such as the standard duplex-type patchcord or ribbon cable. In addition, any of the numerous fiber optic connector styles can be utilized, such as FC, SC, ST, LC or MTRJ. In a particular example, the retracted fiber optic cable is a 2 mm diameter jacketed fiber with kevlar yarn as an internal strength member between the outer jacket and an inner sleeve surrounding the optical fiber. In the preferred embodiment, the cable retraction housing is fabricated of injection molded plastic, wherein the housing consists of identical upper 15' and lower 15 shells joined with screws. The port through which the fiber optic cable exits the housing is sufficiently radiused to prevent excessive bends if the cable is pulled at a sharp angle relative to the housing. The housing shells 15 and 15' are advantageously designed to be identical to minimize the injection molding tooling requirements. In addition, the spool 7 is fabricated from a single two-part injection mold by virtue of the alternating aspect of the reel cover 17 and reel body 18, eliminating the need to fabricate deep side cavities in the spool which would require complex and costly injection mold tooling to fabricate as a single part.

The path followed by the cable at all points within the retraction unit must maintain a bend radius greater than or equal to the minimum bend radius specification for the particular fiber optic cable being used. This is necessary to ensure low loss operation and to prevent mechanical degradation (e.g., cracking) in the case of glass fiber optics. For example, the minimum fiber bend radius is 25 mm for cables consisting of Corning SMF-28 fiber or its equivalents. The ANSI TIA/EIA-568B.3 standard specifies a bend radius of 25 mm under no pull load and 50 mm when subject to tensile loading. Cables comprised of special bend insensitive fiber such as Corning Flex 1060, Lucent D5, Nufern 1550B-HP, or Sumitomo Pure Access or Pure Access-Ultra can withstand a bend radius of 7.5 to 10 mm without exhibiting increased insertion loss or mechanical failure. This is achieved by increasing the numerical aperture of the fiber to increase the guiding characteristics, and in some cases, by reducing the outer diameter of the cladding from 125 to 80 microns.

The constituent fibers may include one or more strands of single mode (SM), multimode (MM), dispersion shifted (DS), non-zero dispersion shifted (NZDS), polarization maintaining (PM), photonic crystal (PC) or plastic optical fiber (POF). The typical wavelengths of operation for telecommunications applications include 850 nm, 1310 nm and 1550 nm (S, C, and L bands). The outer diameter of the bare fiber may be 80, 125, or 200 microns with an acrylate coating of 250 micron diameter, for example. The unit may further include a variety of different fiber types fusion spliced within the housing to form a continuous length of fiber with the desired optical characteristics.

The retractable cable may be an integral structure comprised of a combination of fiber optics and traditional copper wiring. For home use, this cable may include one or more coaxial lines, one or more CAT-5 lines, and one or more fiber optic lines. These multipurpose cables can also be stored within a retraction unit, potentially with an enlarged diameter and stronger power spring to facilitate the winding of stiffer and larger diameter multipurpose cables.

Units to retract fiber optic cables as disclosed herein are of unique importance because optical cables are much more costly and delicate than traditional electronic cables. The performance of an optical network is severely compromised if the cable is damaged and this damage to the internal glass fiber is not generally evident by examining the outer jacket. A damaged fiber optic cable leads to increased insertion loss and decreased return loss, degrading both signal quality and strength. In contrast to an electronic signal, the cost to optically amplify or regenerate an optical signal degraded by a damaged patchcord is high. Therefore, the functionality, quality and reliability of devices and instruments which incorporate the retractable interface disclosed herein are significantly enhanced.

Rotary Interface

This invention further discloses a low loss, non-binding fiber optic rotary element consisting of a continuous length of optical fiber interleaved with a spiral spring. This device accepts free rotation for a significant but finite number (>10) of turns about a central axis. Rotation is accomplished by winding or unwinding the optical fiber about a central mandrel on a central axis while maintaining the minimum fiber bend radius.

FIG. 3 illustrates a fiber optic rotary interface in accordance with the invention. The rotary interface is similar to the structure used to optically connect the rotating spool 7 with the fixed enclosure in FIGS. 1 and 2. In particular, a shaft 46 in which the fiber end 10h is attached rotates freely about an axis 44. Fiber end 10h can rotate relative to the fixed fiber end 10a. The shaft 46 rotates relative to a fixed shaft collar 47 which encloses the turns of the spiral spring 12 and mates with the fixed fiber end 10a along the outer diameter of the collar at location 45. At this location, the spring 12 clips to the outer diameter of the collar 47 at location 32 while the fiber separately exits the collar at location 43. The fiber is locally attached to the spiral spring by use of a self-adhesive backed film 14, adhesive or mechanical carrier, located at spaced apart points along the composite fiber-spring structure.

Figures 3A, 3B:
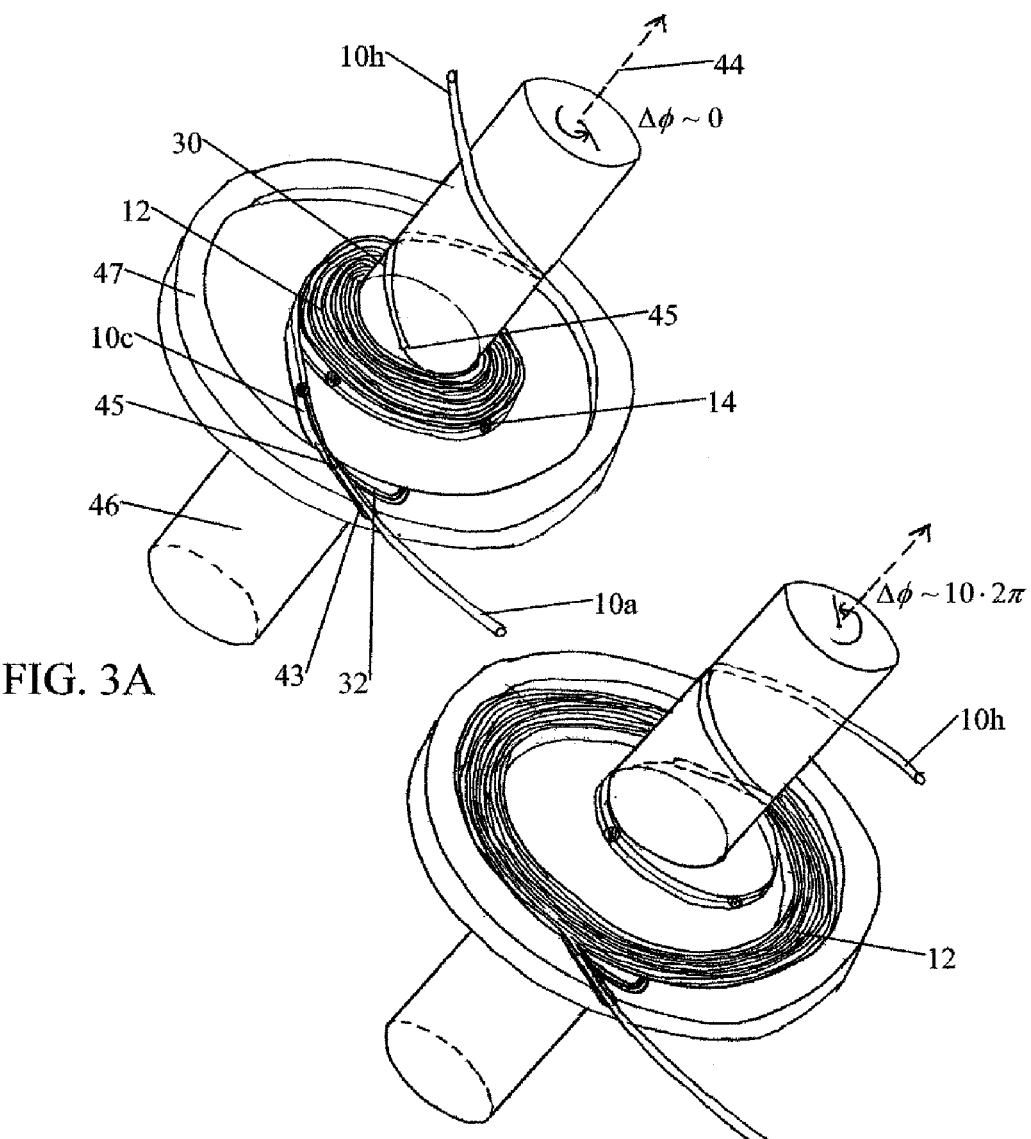
FIG. 3 illustrates a fiber optic rotary unit including a rotating shaft and fixed collar in (3A) fully wound state and (3B) fully unwound state.

The rotary interface in the fully wound configuration is illustrated in FIG. 3A. The spiral spring 12 and fiber 10c composite are tightly wound about the central shaft 46. In contrast, FIG. 3B illustrates the spiral spring 12 fiber 10c composite in the fully unwound configuration. For typical diameters of the collar 47 (5 inches) and mandrel 30 (2 inches), the rotation from the wound to unwound conditions corresponds to 10 to 30 full turns of the shaft 46 about axis 44.

In a particular example, the interleaved spiral spring 12 is fabricated of hard tempered, type 301, 303, 304 stainless steel or 1095 blue tempered, polished spring steel, prepared with rounded edges to reduce friction. The spring rigidity counteracts the tendency of the fiber to bind as it is fully winds about the inner mandrel 30 or fully unwinds about the outer diameter 47. Note that a fiber spiral without the interleaved spring would be unable to fully unwind once a significant number of turns (>3) are in close contact because of the need to exert a pushing force adequate to slide each fiber turn relative to the other. In addition, the round cross section of the fiber results in a tendency of one fiber turn to bind as it lodges between the adjacent fiber turn and the upper or lower surface of the spiral enclosure. The high aspect ratio and stiffness of the spring material prevents this binding.

In many applications, a compact fiber optic rotary interface providing a relatively large number of rotations (i.e. >10) is needed. In a particular example, for a rotary interface with 5 inch outer diameter and 2 inch inner diameter, a fiber of 250 micron outer diameter, a spring of 0.005 inch thickness and 0.250 inch width, a total of over 20 turns can be taken up by the spiral. Furthermore, the extension of this approach to a multi-level, stacked spiral is feasible and allows an even greater number of turns to be accommodated within a given outer diameter. A generic layout of a four level unit providing well in excess of 80 turns is illustrated in FIG. 4.

Figure 4:
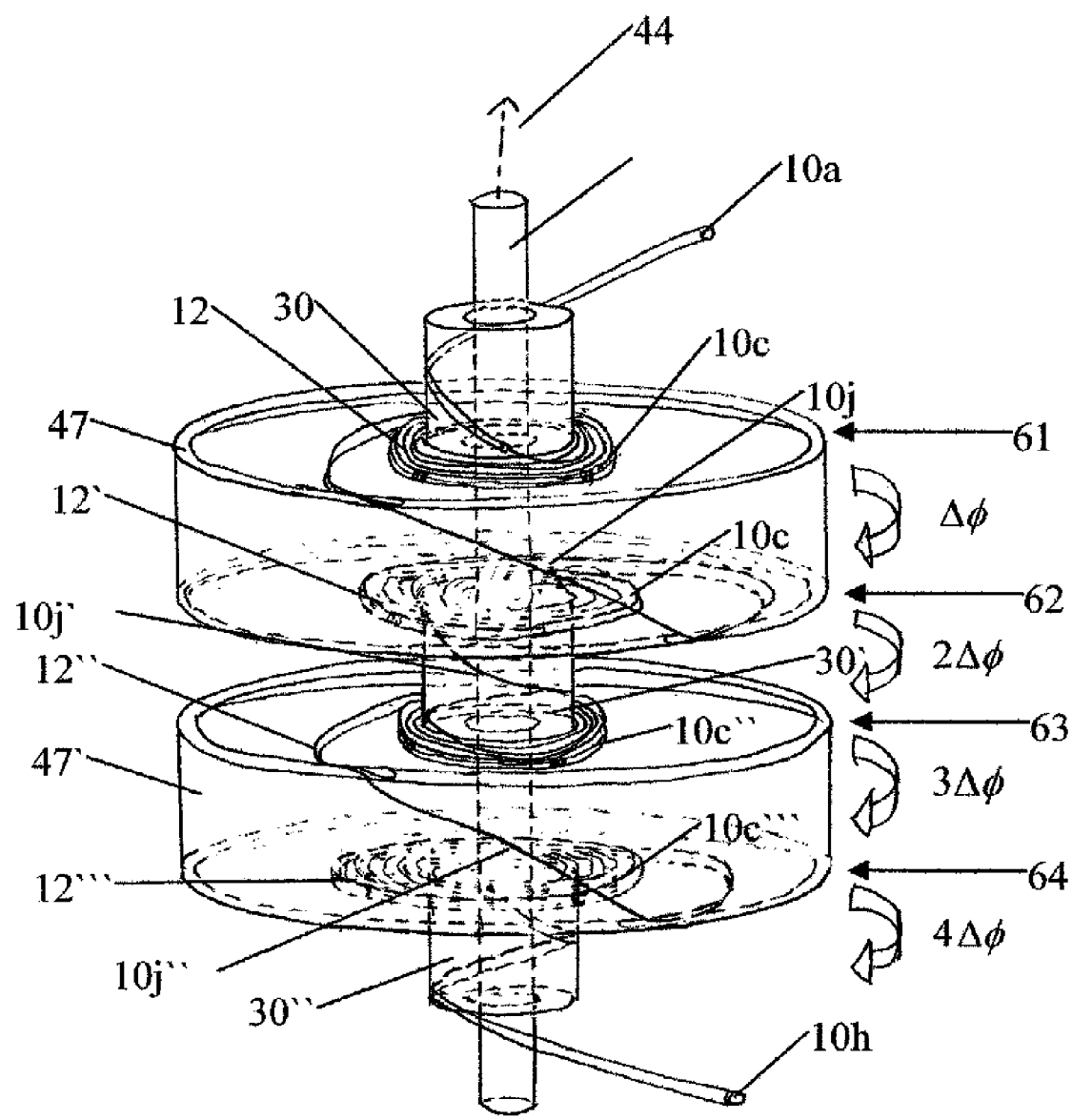
FIG. 4 illustrates a fiber optic rotary unit comprised of multiple levels to increase the achievable number of turns.

The rotary interface element of FIG. 4 illustrates the extension of this inventive concept to a more complex system. The four spring 12 and fiber 10c spirals are labeled 61, 62, 63 and 64. These spirals are concentric with a fixed shaft 46 and rotation axis 44. Spirals 61 and 62 are retained within rotating collar 47 and wind about separate mandrels 30 and 30', respectively. These spirals are joined by a transition fiber 10j along the outer diameter of collar 47. Spirals 62 and 63 are joined by a transition fiber 10j' along mandrel 30', and spirals 63 and 64 are joined by a transition fiber 10j" along collar 47'. The fiber exits spiral 64 by winding onto mandrel 30" and exits the element at rotating fiber end 10h. By stacking spiral units, nearly arbitrary rotation angles can be achieved. As labeled in FIG. 4, collar 47 rotates by an angle $\Delta\phi$ relative to the fixed shaft 46, mandrel 30' rotates by an angle 2 $\Delta\phi$, collar 47' rotates by an angle 3 $\Delta\phi$, and mandrel 30" rotates by an angle 4 $\Delta\phi$, where $\Delta\phi$ is typically 20 turns.

Traditional fiber optic rotary unions such as the type offered by MacArtney Inc., Moog Components Group, Princetel Inc. and Focal Inc. are highly complex multifiber interfaces, which add significant insertion loss, weight and size. The typical insertion loss is 5 dB with an insertion loss variation during rotation of 1 dB for a two fiber interface, and 2 dB with 0.25 dB variation for a single channel interface. Large fiber count rotary interfaces may have in excess of 10 dB insertion loss. Several key optical performance specifications are challenging for present designs of rotary interfaces, namely, insertion loss, return loss, insertion loss variation and crosstalk.

The improved fiber optic rotary couplings disclosed herein are potentially of value in a wide range of security, military and industrial applications. Examples are winches and reels for remotely operated vehicles, radar antennas, streamers, towed arrays, dipping sonar, material handling systems, cranes, turrets, turbines, robotics, cranes, submarine telescopes, wind turbines and remote I/O in industrial machinery and surveillance systems.

Buckling and Fiber Deflection

This invention discloses a unique combination of spring 12, optical fiber 10c and friction reducing elements 14 to achieve a high performance rotary coupling element. The rotary interface may be provided in many fiber optic types such as a simplex, duplex or ribbon cable. In each case, the height of the spring 12 should exceed the height of the cable and be designed to accommodate buckling of the fiber relative to the spring. It is advantageous to reduce the diameter of the fiber optic cable in the rotary interface from the 1.6 mm to 3 mm nominal jacket diameter down to the 0.25 mm acrylate or 0.9 mm tight buffer coating in the spiral region 10c, such that a greater number of turns can be achieved within a given size unit. Wet or dry lubricant (e.g., Teflon, silicone or carbon coating) may be applied to the spring-fiber pair to further reduce friction and wear.

The design of the fiber 10c and spring 12 composite disclosed herein ensures that the delicate glass optical fiber is not subjected to excessive bending or tensile forces during rotation. Since both the fiber and spring are composed of relatively inelastic materials and exhibit non-zero thicknesses, the bending of such a composite structure is susceptible to buckling of the fiber relative to the spring. To overcome buckling, a structure as illustrated in FIGS. 5A-5B is utilized for simplex fiber. The fiber 10c and spring 12 are affixed at spaced apart points at the nominal midpoint along the width of the spring 12 by self-adhesive backed disks 14 with low friction and superior wear and adhesion characteristics. FIG. 5A illustrates the fiber-spring composite in the wound state, wherein all turns of the fiber are wound about the central shaft. FIG. 5B illustrates the fiber-spring composite in the unwound state. As the spring 12 unwinds, the fiber 10g undergoes a slight bend between each point 14 as a result of the different radii of curvature changes experienced by the spring and fiber as the mean diameter of each turn of the spiral increases. The change in circumferential length of the fiber versus the adjacent circumferential length of spring (buckling length) for a change in radius is equal to $2\pi \, \Delta r$, where $\Delta r$ is the center-to-center spacing of the fiber-spring combination, typically equal to 0.0075 inches for the most compact implementations. The buckling length per turn is therefore about 0.05 inches.

In a particular example, the disks 14 are spaced every ninety degrees along the fiber/spring spiral. The minimum spacing between each attachment point is selected such that the radii of the local bends on the fiber remain greater than the minimum bend radius of the fiber. In addition, the maximum spacing between each attachment point is selected such that the deflected fiber 10g does not interfere with the upper or lower edge of the spiral spring. A cross section of this structure is illustrated in the inset to FIG. 5B. The edges 27 of spiral spring 12 are advantageously rounded to reduce friction within the mechanism. In a particular implementation, for a spiral spring of 0.25 inch width, minimum radius of curvature 1 inch and maximum radius of curvature 2.25 inches, the disks 14 are placed approximately every ninety degrees along the spiral.

Figure 7A:
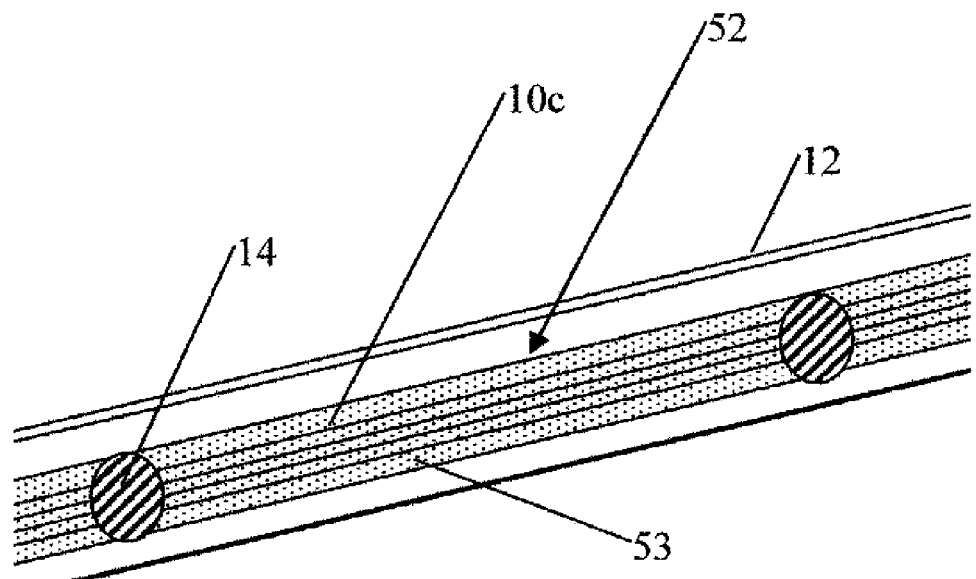
FIG. 7 details a single turn of spiral spring with fiber optic ribbon cable attached, from (7A) side view and (7B) top view.
Figure 7B:
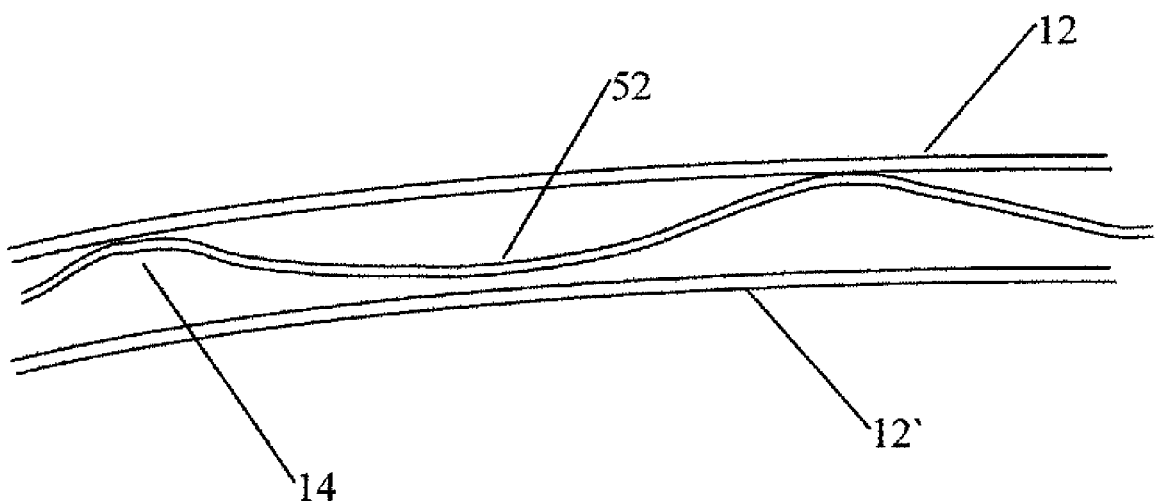

A fiber-spring structure as illustrated in FIG. 6A-6B is utilized for duplex fiber. The details are similar to that of FIG. 6, except that two optical fibers 10c and 10c' are attached to the single spiral spring 12. Alternately, a ribbon fiber-spring structure is illustrated in FIGS. 7A-7B. FIG. 7A illustrates the side view of the spring 12—ribbon cable 52 combination. The fiber optic ribbon cable 52 may include in excess of ten individual optical fibers 10c embedded in a kapton film carrier 53, for example. The attachment to spring 12 may use self-adhesive tape as in the previous examples, or a self-adhesive may be applied directly to the kapton carrier of the ribbon cable at spaced apart points. The large aspect ratio of the ribbon cable 52 reduces the vertical deflection of the cable. As illustrated in the top view of FIG. 7B, the effective buckling direction is now normal to the surface of the spring 12. The design considerations are similar to those of the single fiber, in which the distance between the spaced apart contact points are selected such that the bend radius produced by buckling is less than the minimum bend radius of the fiber 10c.

Power Spring and Spiral Spring

The fiber optic rotary interface is comprised of a length of fiber optic cable in a spiral configuration which connects a point on the outer diameter with a point on the inner diameter. The inner and outer diameters are free to rotate relative to one another by winding the spring coil there between. To achieve this operation in a satisfactory manner, a novel spring-fiber optic cable pair has been developed. The design considerations to optimally accomplish unwinding and winding of the spiral are described next.

The length of cable and spring required to produce a spiral with N turns of maximum diameter D and inner diameter d is given by the following equation:

$$L \cong \frac{\pi N(D+d)}{2} \quad (1)$$

N, the total number of turns of the spiral, is given by:

$$N = \frac{(D-d)}{2t} \quad (2)$$

where the cable plus spring thickness is equal to t. The actual number of turns taken up by the spiral is only a fraction of this total number of turns. For example, a fully wound spiral may have 30 turns and a fully unwound spiral may have 20 turns, producing a total of 10 differential turns of the mandrel relative to the housing. Based on equation 2, it is advantageous to reduce the thickness of the fiber 10c in this rotary interface region by removing the fiber's jacket and aramid yarn such that the number of turns in a given maximum diameter can be increased. In addition, it is advantageous to eliminate the fiber's tight buffer and utilize bare fiber of 0.250 mm diameter.

The outer diameter D of the spiral is computed from equations (1) and (2) and is equal to:

$$D \cong \sqrt{d^2 + \frac{4tL}{n\pi}} \quad (3)$$

The length of the fiber optic cable and spring which maximizes the number of turns for a given inner and outer diameter is given by l:

$$l = \frac{D^2 - d_1^2}{2.55t} \quad (4)$$

This is the total length of cable in the spiral, which is typically two times larger than the length which can be retracted if fiber 10c is 0.900 mm diameter tight buffer and three times larger if fiber 10c is 0.250 mm bare fiber. This is based on the assumption that the reel 16 outer diameter is nominally equal to the outer diameter of the spiral junction, which is a particularly compact configuration. Because of the superior light and signal transmission characteristics of optical fiber, this additional latent length of fiber (typ. 15 meters long for a 5 meter extendable/retractable length) within the spiral does not compromise the optical performance. Also, unlike electronic cables whose high frequency signal transmission characteristics may suffer from the inductance produced by coiling the wire, optical cables do not suffer from this effect.

This geometry produces a total number of rotations in the rotary interface ΔN equal to:

$$\Delta N = \frac{4l}{\pi U} \quad (5)$$

where the geometric factor U is a parameter relating the inner and outer diameters according to:

$$U \equiv \frac{D^2 - d_1^2}{\sqrt{2(D^2 + d_1^2) - (D + d_1)}} \quad (6)$$

U generally increases with increasing inner and outer diameters of the spiral. As a result, from equation 5 it becomes more difficult to get large ΔN when the inner diameter is large, as is the case to maintain the minimum fiber optic bend radius. For this reason, the design of practical fiber optic rotary interfaces requires careful optimization of factors such as friction and fiber diameter to maximize ΔN, factors which do not play a role in typical power spring based devices such as retractable electronic cables. For a large number of turns (>3), it is difficult if not impossible to unwind a coil composed of fiber alone by rotating the inner diameter. The frictional force between the adjacent fiber turns causes significant binding. However, by adding a spring interleaved with the fiber as disclosed herein, the spring stiffness provides the separation and slippage of the windings necessary to unwind the spiral.

For example, for a unit of 125 mm outer diameter and 50 mm inner diameter with 900 micron tight buffered fiber, 7 complete rotations are possible and the length of spring and fiber in the spiral is equal to 5 meters. The corresponding total number of turns of the spiral when fully wound on the inner diameter is 19. The total number of turns when fully unwound is 12. The difference is equal to the number of turns which can be buffered by the rotary unit. In an alternate example, a spiral spring-fiber unit of 130 mm outer diameter and 55 mm inner diameter with 250 micron fiber and 0.005 inch thick, 0.250 wide spring provides a total of 20 rotations and a 15 meter long spiral. The torque produced by the spiral spring 12 in this latter example is only 0.3 ounces, so a separate power spring is necessary to rewind the reel.

The spiral spring 12 can be alternately designed to provide adequate torque to initiate rewind so that a power spring 13 is not required. For example, if the thickness of the spring is increased to 0.012 inch thick in the above example, the torque increases to 4 ounce-inches for a total of 14 rotations and a 10 meter long spring 12. However, the number of rotations achievable within a given size spiral decreases as the spring is made thicker. For this reason, for embodiments requiring compactness and light weight, it is advantageous to incorporate a separate power spring. In addition, an excessively large torque of the interleaved spring increases the contact friction such that the fiber cable and spring are not able to slide freely.

The power spring 13 rotates the spool 7 and winds the fiber optic cable 10e about the annulus 11. Power springs store or deliver rotational energy in the form of torque on a shaft and are also known as clock or motor springs. Spiral-wound flat metal strips are available in a wide range of sizes and configurations for clock and mechanical motors, tape measures, counterbalance mechanisms, reel returns and rewind devices. Power springs are designed to have a typical service life in excess of ten thousand full spring extensions. They provide a low cost and light weight approach to powering the cable retraction unit.

The retraction force generated by a power spring is based on its thickness, width, inner diameter and outer diameter. A retraction force adequate to overcome the weight, friction and stiffness of the cables is necessary. The design formulas for power springs are available from Mechanical Springs, Second Edition, Wahl, McGraw-Hill (1963) Chapter 12. The spring thickness h is selected such that a particular moment M (in inch-pounds) is produced for a spring width b and geometry factor U:

$$h = \sqrt[3]{\frac{1.5MU}{Eb}} \quad (7)$$

The force produced by the spring typically goes from the maximum torque M down to zero as the number of turns equals $\Delta N$, the maximum number of turns. The working number of turns is taken to be a fraction of this, typically 0.5. A typical 2 to 3 mm simplex jacketed fiber requires a power spring moment M on the order of 3 ounce-inches to fully retract for a nominally 5 inch diameter spool. Note that if the torque is too large, the fibers will be aggressively retracted and potentially damaged. For a low profile spring of 0.25 inch height, this torque can be provided by a spring with 0.007 inch thickness and an inner mandrel diameter of 0.25 inch.

Typical springs are fabricated of blue tempered and polished spring steel with modulus of elasticity 30 $10^6$ psi or hard tempered stainless steel of modulus 27 $10^6$ psi. To ensure reliability under humid conditions, the preferred spring material is corrosion resistant stainless steel.

Pawl Force Balance

Figure 8A:
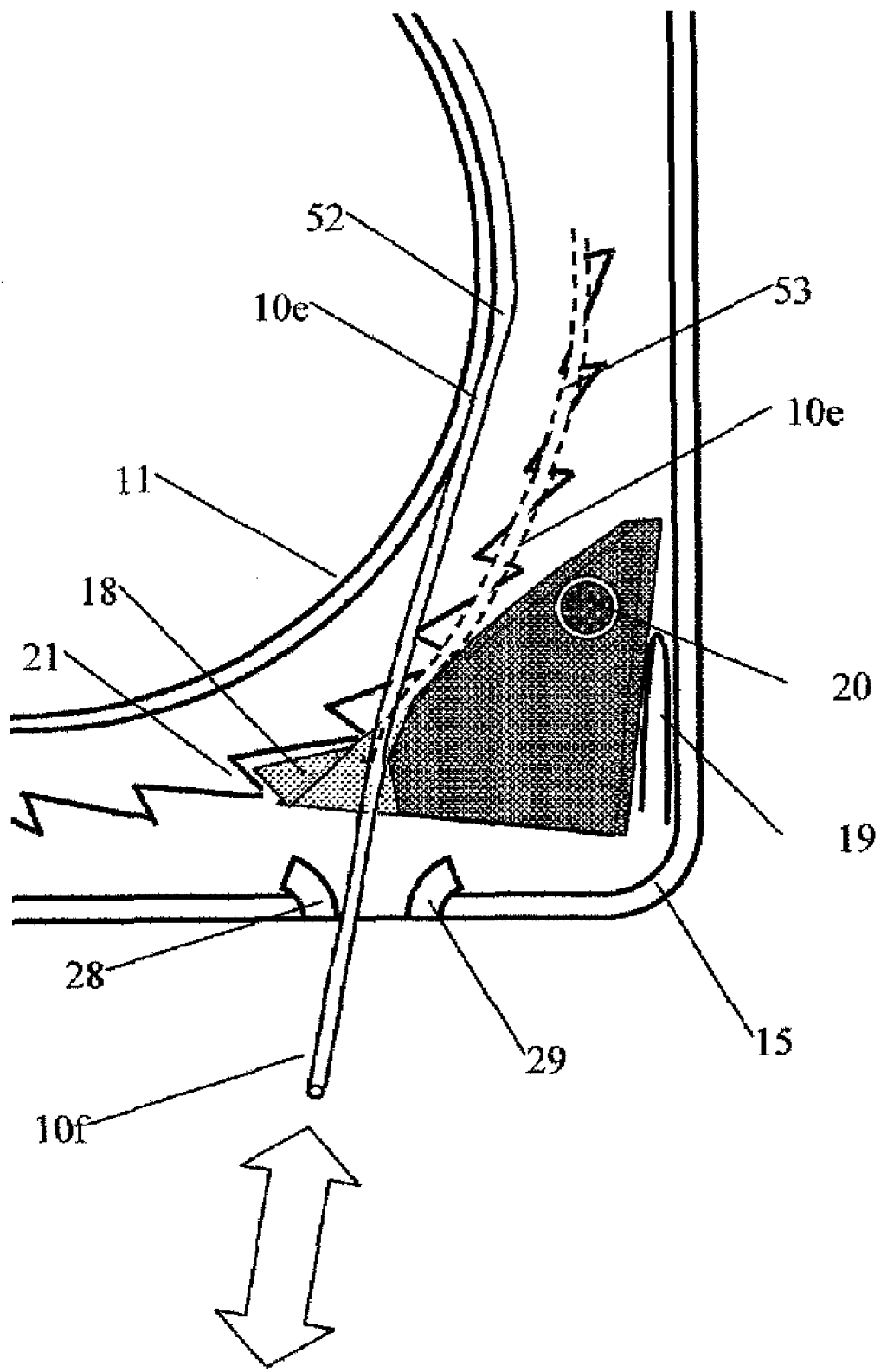
FIG. 8 details the ratchet-pawl mechanism when (8A) the pawl is engaged and (8B) disengaged.
Figure 8B:
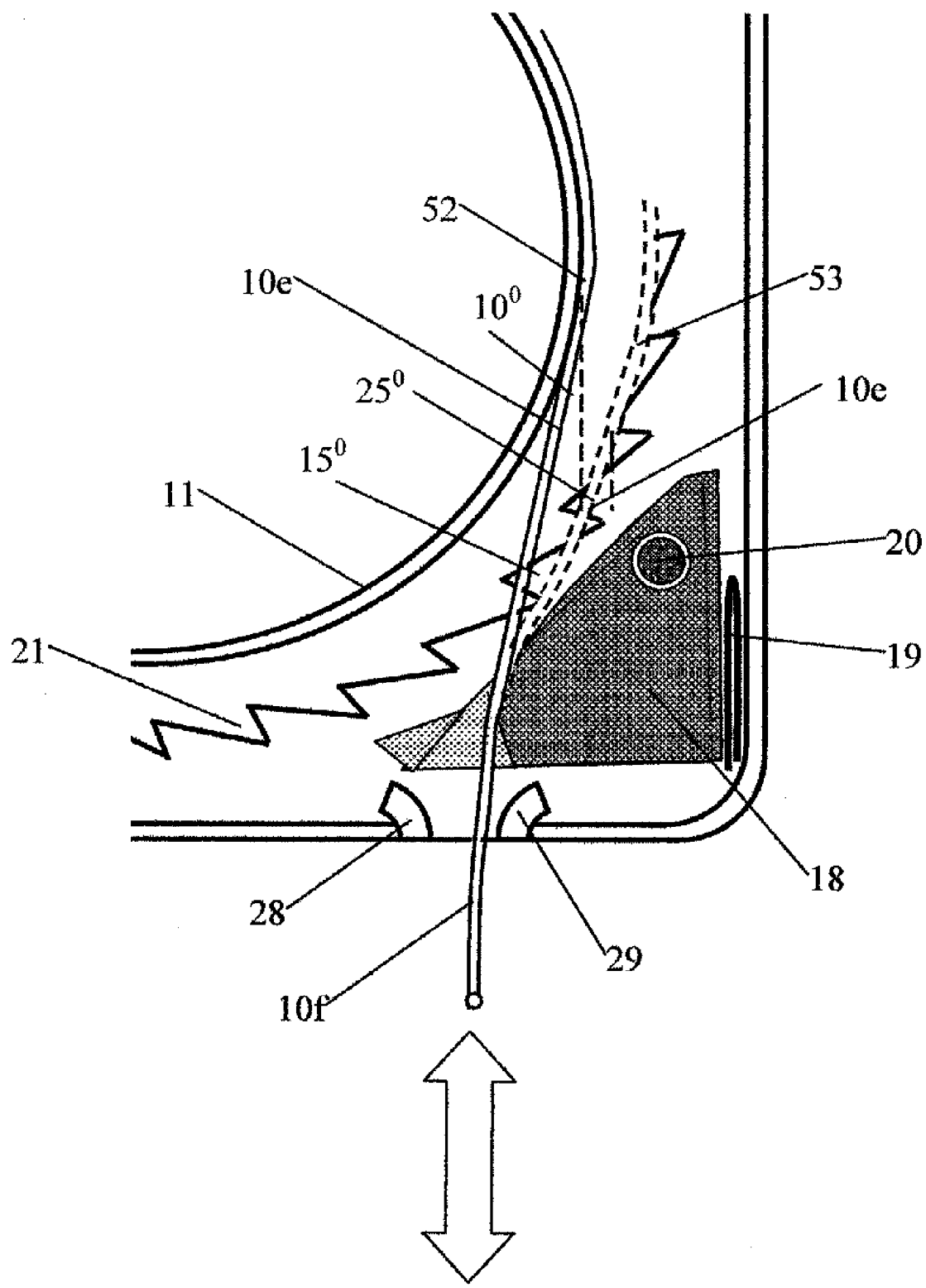
Figure 9:
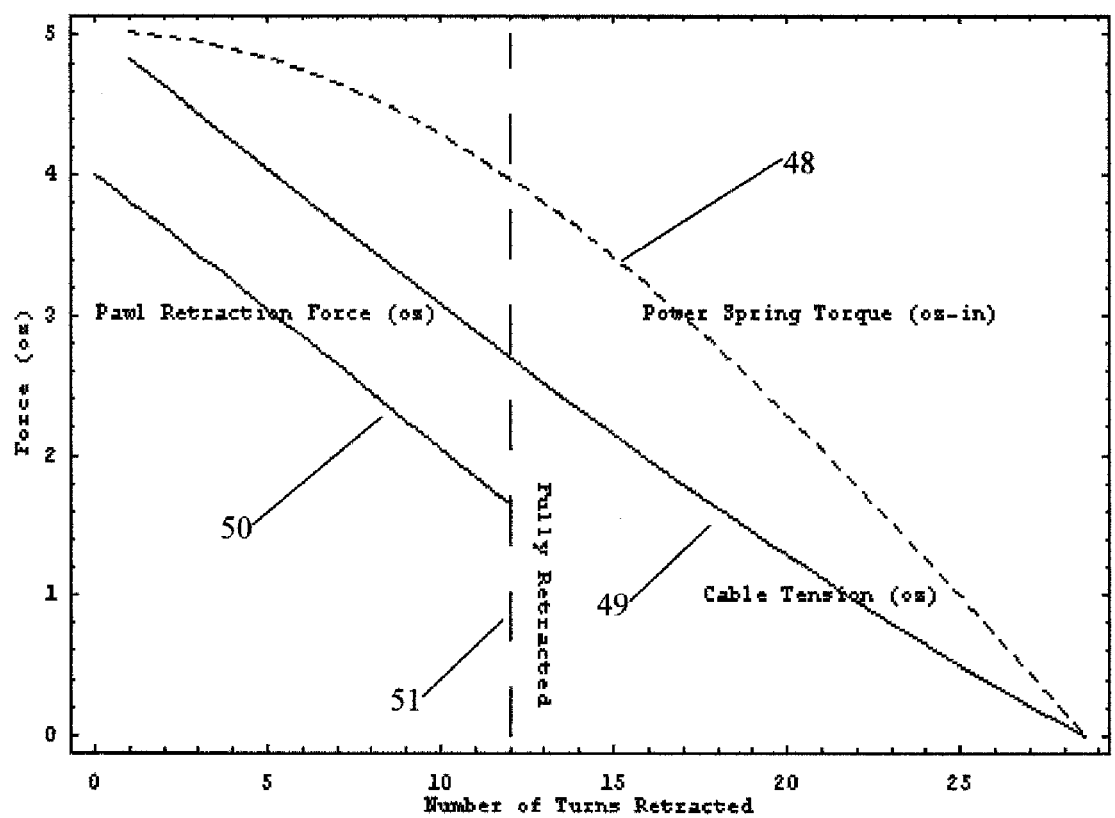
FIG. 9 graphically depicts the relationships between the power spring torque acting on fiber reel, fiber optic cable tension and effective force of fiber on pawl as a function of the number of rotations of the reel.

The fiber optic cable retraction unit 100 incorporates a ratchet/pawl mechanism to allow incremental extension and retraction of the cable 10f from the unit. FIGS. 8A-8B details the ratchet-pawl mechanism. The outer diameter of the fiber reel 16 includes notches 21 which engage with the pawl 18. The pawl 18 is loaded by a spring 19 which maintains locking of the reel in the absence of tension on the fiber. As discussed in the description of the power spring design, the torque produced by the power spring 13 and transferred to the reel 16 decreases as the power spring unwinds. FIG. 9 graphically illustrates the changes in the spring torque and cable tension as the cable is retracted into the housing. The power spring torque 48 results in a tension 49 on the fiber which decreases approximately linearly as a function of the number of turns retracted onto the reel. At the same time, the geometry of the pawl 12 and the fiber 10e is designed such that the force required to retract the pawl 50 also decreases with the number of turns retracted. In particular, as the fiber is unwound from the reel 16, the angle of the fiber tension relative to the pawl varies significantly from position 53 where the fiber 10e' fully wound (25 degrees) to position 52 where the fiber 10e is fully unwound (10 degrees). The forces in the fully wound state or retracted state are distinguished by the dashed line 51 of FIG. 9, while the forces in the fully unwound state correspond to the leftmost vertical axis of FIG. 9 (zero turns retracted).

In this particular example, the change in angle of the fiber tension relative to the pawl is optimally 15 degrees, which produces about a factor of two to three variation in the force transferred from the fiber to the pawl. In such a mechanism, it is important that the forces acting on the pawl are optimally balanced to provide smooth action during retraction and extension. Curve 50 in FIG. 9 illustrates the required pawl retraction force as a function of the number of turns retracted. For this particular design example, the number of turns to fully retract the cable is equal to 12 turns, demarcated in FIG. 9 by the dashed line 51. Force balance is achieved since the difference between the cable tension curve 49 and pawl retraction force 50 is a constant independent of the number of turns retracted. As a result, the feel of the pawl's mechanical action is maintained throughout the entire length of retracted cable. Therefore, the factor of two to three variation in force transferred to the pawl based on this 15 degree geometry compensates for the factor of two reduction in the rewind tension as the power spring unwinds, an optimal force-balanced configuration.

FIG. 8A illustrates the geometrical relationships between the fiber 10e and pawl 18 when the fiber end 10f is pulled towards the left-most edge 28 of the fiber exit port. In this position, the fiber is free to be retracted or extended since the pawl 18 is withdrawn from the notches 21 of reel 16. On the other hand, FIG. 8B illustrates the geometrical relationships between the fiber 10e and pawl 18 when the fiber end 10f is pulled towards the right-most edge 29 of the fiber exit port 8. In this position, fiber retraction is inhibited since the pawl 18 is engaged with the notch 21 of reel 16.

Assembly System

Figure 10:
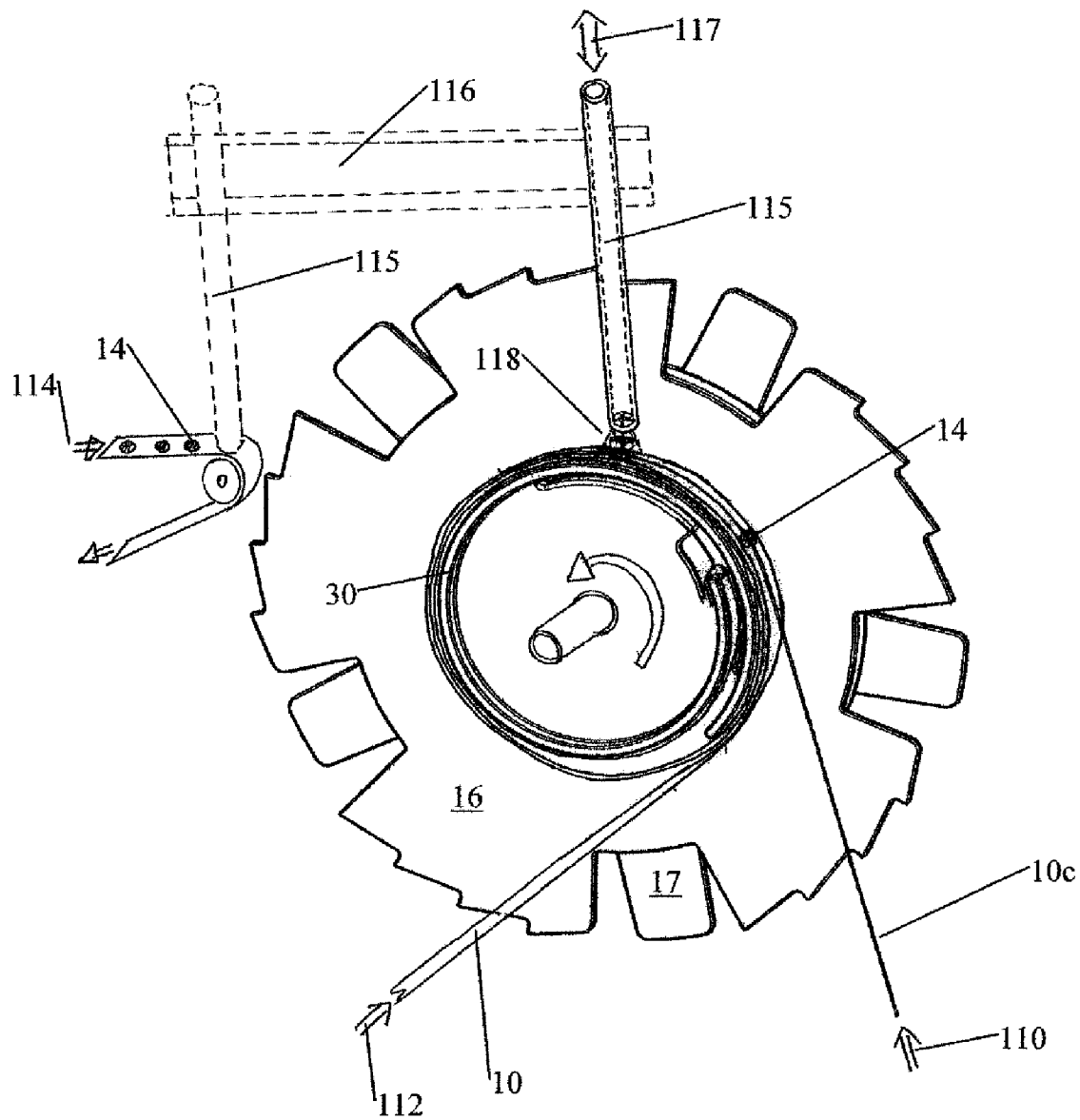
FIG. 10 illustrates an assembly system to fabricate the spiral fiber optic-spring composite.

The composite fiber/spring structure is fabricated in an automatic fashion by use of a computer controlled winding system. FIG. 10 illustrates schematically a winding system in which a source of spring material 112 and fiber 110 are wound onto the mandrel 30 of fiber reel 16. Self-adhesive material is applied by use of an air applicator 115 which reciprocates between a source of self-adhesive material 114, which presents an individual disk 14 to applicator 115 (connected to a vacuum source 117), and the reel 16. The applicator 115 translates along 116 to the mandrel 30 wherein the applicator is switched from a vacuum to pressure source 117. A burst of compressed air propels the self-adhesive disk 14 onto the spring 12—fiber 10c combination such that the disk uniformly adheres to the spring and conforms to the fiber. The combination is held in alignment such that fiber 10c is at the nominal center of spring 12. Self-adhesive disks 14 are applied every quarter turn of the reel 16, for example, wherein the reel is rotated to position by use of a stepper motor. Since the fiber is attached to the spring in a configuration of minimum radius of curvature experienced during normal usage of the assembly, the fiber is attached with slight tension to remain taught. Tension in the source spring 112 and fiber 110 are controlled by use of mechanical or electromechanical brake mechanisms attached to the spring and fiber payout spools.

Applications

Figure 11:
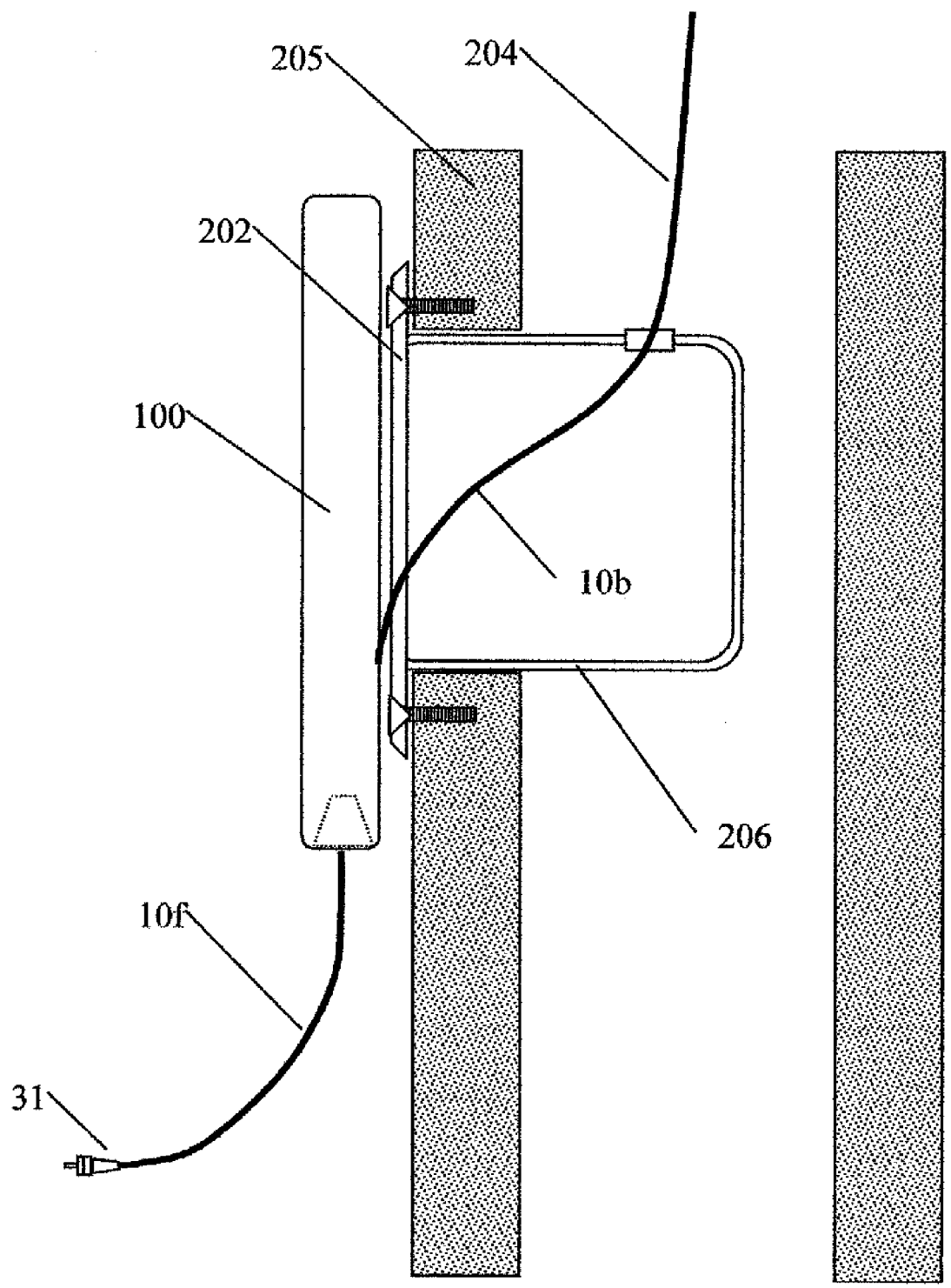
FIG. 11 illustrates a retractable fiber optic unit as part of a wall mount fiber distribution system.

In one example, a wall mounted cable retraction unit 100 (FIG. 11) provides a low profile device for fiber optic cable distribution. The faceplate 202 is attached to a distribution box 206 mounted within a wall or partition 205. The fixed fiber 10b is attached to a fiber optic drop cable 204 and the extendable fiber 10f with connector 31 is used to interface the fiber optic signal to the desired location. The length of the cable can be extended to a distance of 5 meters, for example.

Figure 12:
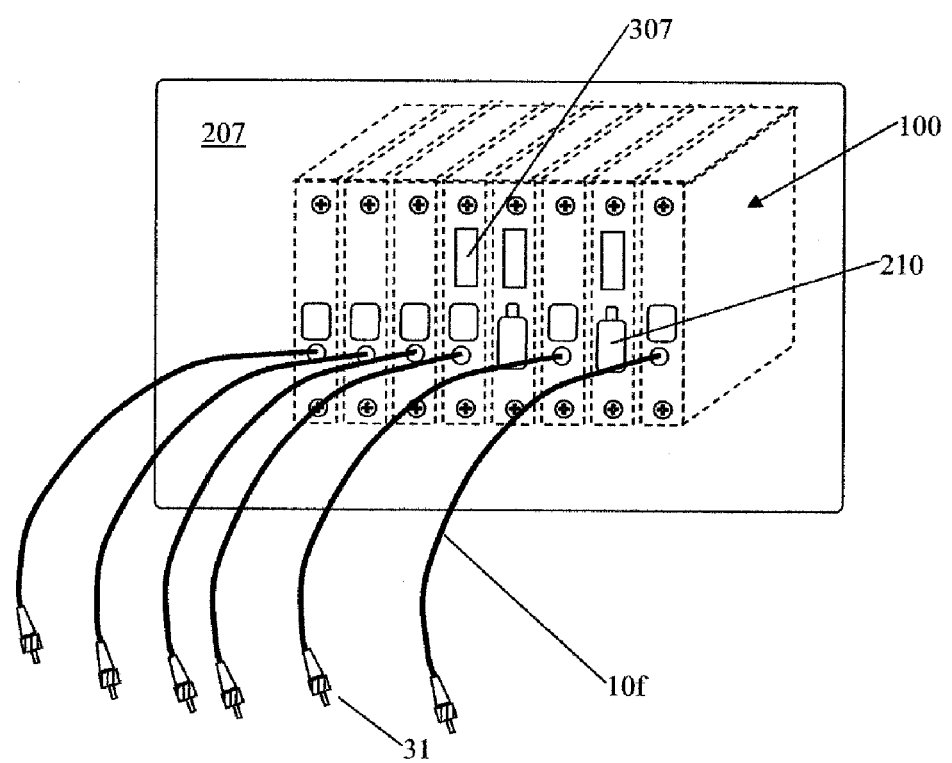
FIG. 12 illustrates a multi-fiber distribution system incorporating retractable fiber interfaces.

In a further example, the cable reel assembly 100 may be incorporated into a rack mount shelf or instrument 207 (FIG. 12). The connector interface 31 is potentially protected by a dust cap 210. The fixed end of cable 10b may be spliced to the primary multi-fiber cable feeding the unit 207 which is configured as a patch panel. Each unit 100 may further include optical power monitoring functionality, in which case the housing includes displays 307 for power readout. These readouts may be of the reflective liquid crystal display (LCD) type, for example.

Figure 13:
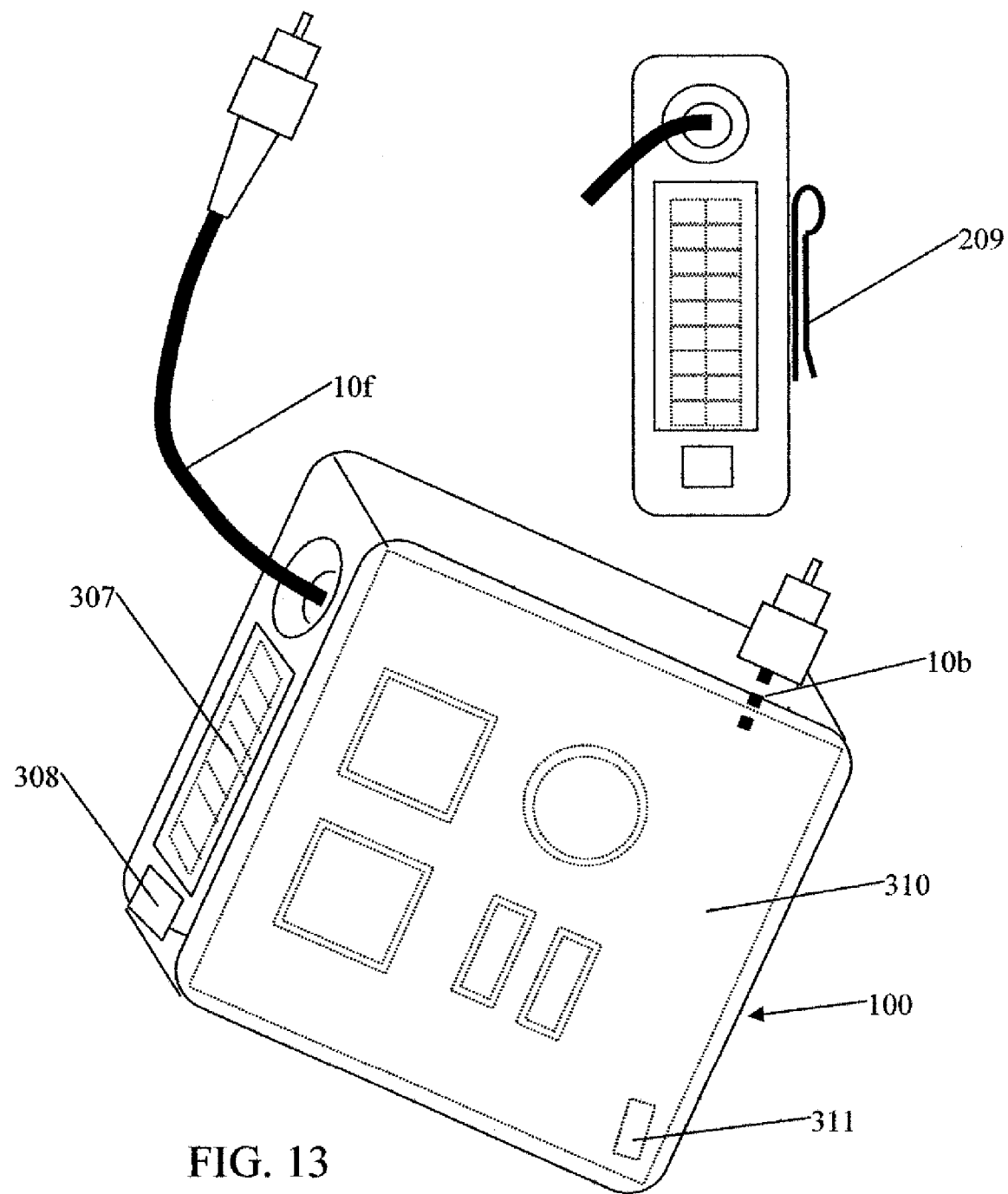
FIG. 13 illustrates a retractable fiber unit including optical power monitoring functionality.

In a further example, the cable retraction unit 100 disclosed herein may include an optical tap photodetector 311 interfaced with electronic components on a printed circuit board 310 within the reel housing (FIG. 13). The optical tap photodetector 311 may be comprised of a fused fiber tap coupler or a microoptic tap coupler (e.g., with coupling ratios 1:99%, 3:97%, 5:95%) which outcouples a small amount of optical power traveling through the fiber and directs it onto the detector. The detector may be, for example, an InGaAs, GaAs or Ge pin photodiode for 700 to 1600 nm wavelengths, or a Si photodiode for 700 to 900 nm wavelengths. The optical signal produces a current across the photodiode, which is converted to voltage by a transimpedance amplifier circuit and displayed as a digitized representation on LCD 307. The cable retraction unit 100 may further include a belt-clip attachment 209 for field use or a magnetic clip for temporarily attachment to other equipment or structures. The unit includes a retractable fiber end 10f and fixed end 10b.

The photodetector and display circuit are implemented on a pcb board 310 wherein the output voltage of the transimpedance amplifier is digitized by an A/D converter. The gain of the transimpedance amplifier is set by an autogain circuit consisting of a comparator. A signal proportional to the optical power is input into an LCD driver chip, which presents an alphanumeric representation of the optical signal power in units of "dBm" on a reflective type LCD, for example. The voltage on the LCD is scaled to read-out optical power in units of dBm and/or watts with a dynamic range up to 70 dB and a sensitivity of −50 dBm. In a particular embodiment, the signal level is displayed on a 1 row, 16 column LCD character display integrated into the reel enclosure. To minimize power consumption, it may be preferred that the LCD not include a backlight. In a further example, the digital readout can display the total length of the extended patchcord by integrating an encoder into the reel assembly. In an alternate embodiment, one or more LEDs may be incorporated into the unit, wherein the color or state (e.g., flashing or continuous) of the LEDs indicate the signal level or data transmission status.

In an additional example, a radio frequency identification (RFID) transponder is incorporated into the retraction unit. The transponder is used for inventory management or, in combination with the optical power detecting means described above, is used to identify and locate a damaged cable in inaccessible areas, for example. The RFID transponder receives the optical signal level measurement from the detection circuit and transmits it along with an identification code for the cable.

In an additional example, fiber optic modules and subsystems, such as optical transceivers, monitors, receivers, amplifiers, attenuators, multiplexers, switches and passive components such as splitters, mode conditioning patchcords, filters, isolators and circulators advantageously incorporate retractable cable interfaces or are packaged within the housing of the retractable cable unit 100. These active or passive fiber optic components typically include one or more connectorized, fiber optic pigtails permanently attached to the package. If the pigtail is damaged within about 10 cm of the package, it is generally not possible to repair. Therefore, it is advantageous to package the modules such that excess pigtail lengths are retracted within a protective housing. In devices such as arrayed waveguide gratings with high fiber counts, a multi-fiber ribbon-type patchcord is typically used. The design principles of retraction units for single cables apply equally well to these multi-fiber ribbon cables. In such devices, the fixed fiber end 10a may be coupled to an optical component internal to the device housing, rather than exiting the housing.

In conclusion, a fiber optic rotary interface and its application to a fiber optic cable retraction unit has been disclosed. The interface consists of a continuous length of interleaved coiled spring and optical fiber in a spiral configuration. The retraction unit produces a negligible increase in insertion loss by utilizing a single, continuous cable wound in a spiral arrangement which maintains at least a minimum bend radius. This retraction unit is compact and may provide additional functionality such as optical power and status monitoring, attenuation, amplification and mode conditioning means. Furthermore, advanced active components such as transceivers, receivers, fiber amplifiers and optical switches may incorporate such a cable retraction mechanism to significantly enhance their reliability and ease of use.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A retractor/dispenser system for optical fiber cable, in which the cable is continuous and kept at a radius of curvature in excess of an established minimum, the system comprising:

a housing having a central axis and including a first outlet port for withdrawing and returning optical cable from the housing, and a second outlet port for a fixed end of the optical cable;

a rotatable cable spool concentric with a central axis in the housing, the cable spool having an annular surface for winding optical fiber thereon, the annular surface having a radius of curvature at least greater than the minimum bending radius;

at least one fiber optic cable wrapped around the periphery of the annulus and including at least one cable end extending through the first port, the wrapped cable having an insulated jacket section extending with optical continuity to a section of substantially smaller diameter at a transition region;

an interleaved and co-extensive length of coil spring and length of smaller diameter cable coupled to the transition region of the cable, and wrapped about the spool, the lengths of the wrapped spring and cable alternating radially within the interleaved structure which is helically concentric with the central axis, one end of the spring being fixed to the spool at one radius and the other being coupled to the housing at a greater radius from the central axis, such that the interleaved cable/spring structure provides, by expansion or contraction of the helical form between the coupled ends, a variable length of cable for accommodating changes due to rotation of the spool as cable is extracted at the first port, and another section of cable coupled with optical continuity to the fixed end to the interleaved spring/cable combination and extending from the housing at the second port to provide a fixed end for external interconnection.

2. A system as set forth in claim 1 above, wherein the rotatable spool comprises parallel reel body and reel cover portions extending transversely to the central axis from the annular surface, for retaining the jacketed cable which is wrapped therearound, wherein the reel body includes a peripheral ratchet surface and the system further includes a pawl mechanism mounted adjacent the first outlet port and disposed to engage the ratchet in response to changes in position of the optical cable adjacent thereto so as to angularly position reel body to retain the cable at a selected extracted length.

3. A system as set forth in claim 2 above, wherein the system includes a fixed shaft coupled to the housing, disposed along the central axis, for supporting the rotatable spool, and the reel body has a superior side facing the reel cover and supporting the annulus on which the jacketed cable is wrapped, and the reel body also includes an inferior side with a mandrel disposed about the central axis at a radius greater than the minimum bending radius, and wherein the interleaved cable/spring combination is wrapped about the annulus and secured to the reel body at an inner end and to the housing at the outer end, at a radial distance from the inner end.

4. A system as set forth in claim 3 above, also including a power spring helically disposed on the superior side of the reel body and coupled at one end to the reel body and at its other end to the shaft, and wherein the interleaved coil spring/cable combination is disposed on the inferior side of the reel body at a radially more distant location from the central axis than the power spring.

5. A system as set forth in claim 4 above, wherein the power spring provides up to 5 inch-ounces of torque, and the helical interleaved spring provides less than 10% as much, and wherein in addition the interleaved spring/cable combination includes low profile, low friction elements attaching the cable to the spring as spaced apart points therealong.

6. A system as set forth in claim 2 above, wherein the pawl mechanism comprises a spring-loaded pawl and a biasing spring urging the pawl toward engagement with the ratchet teeth, the pawl being positioned to be engaged by the cable at the first outlet port to overcome the bias and disengage from the ratchet teeth when tension is exerted on the cable at above a predetermined limit.

7. A system as set forth in claim 1 above wherein the cable and the interleaved cable/spring combination comprise at least two parallel optical fibers.

8. A system for controllably rotating a length of optical fiber cable to extract and rewind the cable, while maintaining optical continuity and avoiding excessive stress and optical distortion in the cable, comprising:

a base unit disposed about an axis and including a surface for a helically looped optical cable disposed about the central axis;

a rotatable body concentric with the axis of the base unit and rotatable with respect thereto, the rotatable body having a concentric surface with greater than a predetermined minimum radius for winding optical fiber thereon;

an interleaved structure comprising a length of coil spring and a cable length having multiple turns wound about the central axis and disposed in the base unit, the interleaved structure being helically wound on the rotatable body about the central axis with the turns of spring and cable disposed in radially alternating turns, one end of the interleaved structure being fixed to the base unit at a given radius from the axis and the other end being coupled to the rotatable body at a radius greater than the given radius, and the interleaved structure being free to expand and contract circumferentially in response to angular displacement.

9. A system in accordance with claim 8, wherein the system comprises a multi-fiber rotary coupling and the base unit comprises a base disk and the rotatable body comprises a central shaft, mounted along a common axis, the interleaved structure being disposed on the base disk about the central axis with cable ends fixed to the base disk and shaft at different radii and cable free to expand and contract radially therebetween within limits.

10. A system in accordance with claim 8, wherein the base disk has a peripheral flange providing an outer limit for circumferential expansion of the interleaved structure, and wherein one terminal of the fiber extends from the periphery of the base disk and the other terminal is wrapped at least partially about the shaft.

11. A system in accordance with claim 8, wherein the base unit comprises a fixed central shaft and the rotatable body comprises a pair of cable support disks at different positions along the central shaft, and rotatable with respect thereto, each of the support disks having a helical interleaved spring/cable structure disposed thereon in a separate plane transverse to the central axis, the cables including an interconnection therebetween wrapped about the shaft.

12. A cartridge system for supplying and retracting jacketed optical fiber cable while maintaining optimal continuity along the optical fiber between a fixed port and a supply/extraction port on the cartridge, comprising:

a housing having an outer periphery including at least one spaced apart fiber cable port, one of which is a control port for extraction and retraction of cable;

a shaft disposed along a central axis in the housing and coupled to the housing;

a cable spool within the housing rotatable about said shaft, the spool including a cable winding support annulus concentric with the central axis and having a radius from the central axis greater than a predetermined minimum bending radius for the optical fiber;

the cable spool also including a pair of spaced apart generally planar elements transverse to the central axis and comprising a reel body having a perimeter with ratchet teeth and a reel cover spaced apart from a superior side of the reel body, the reel body including an inner transition aperture extending between superior and inferior surfaces of the reel body and within the annulus;

a power spring helically wrapped about the central axis within the annulus and having a fixed end engaged to the shaft and a movable end engaged to the annulus;

the system also including an annular mandrel on the inferior side of the cable spool and concentric with the central axis, the mandrel having a radius from the central axis that is greater than the predetermined minimum bending radius;

a spiral spring adjacent the inferior side of the reel body and disposed about the mandrel, the spiral spring being coupled at one end to the mandrel and at a second end to the reel body adjacent its perimeter;

an optical cable including a number of varying diameter sections that are optically continuous and include a first section of jacketed fiber wrapped about the annulus;

a second section of the optical fiber cable being a small diameter section, unjacketed or with a small diameter cover, and interleaved with the spiral spring along its length between the end fixed to the mandrel and the end fixed to the reel body, the second section being coupled to the first via the transition port in the reel body;

a number of separate attachment elements coupling the optical fiber to the spiral spring at spaced apart points therealong;

a third section of optical fiber cable, the third section being jacketed and extending from the second section of fiber cable to provide a fixed optical fiber cable terminal;

a pawl mechanism disposed to engage the ratchet teeth to retain the reel body in a selected angular position;

wherein when the free end of the jacketed cable is withdrawn from the control port and cable is unwound from the spool, the spool rotation winds up the power spring at the same time that the spiral spring is wound to provide a compensating length of fiber within the housing by the variation in radius of the turns in the interleaved structure.

13. The invention as set forth in claim 12 above, wherein the pawl mechanism is disposed adjacent the control port and the jacketed fiber cable adjacent the control port is positioned to disengage the pawl from the ratchet teeth when the fiber cable is tensioned, and wherein the spool is constructed with complementary radially extending arcs of material on the reel body and the reel cover, such that the spool may be injection molded as a single unit; wherein the spring compliance of the spiral support provides a torque of the order of 0.3 inch-ounces and wherein the spring compliance of the power spring provides a torque of the order of 3 inch-ounces with a maximum of 5 inch-ounces.

14. The system as set forth in claim 13 above, wherein the radius of the annulus of the mandrel is selected such that, with an adequate length of interleaved spiral spring and fiber cable, the system provides in excess of 5 meters of accessible optical fiber cable, and wherein the power spring and spiral spring are metal strips of steel.

15. The system as set forth in claim 14 above, wherein the spiral spring has a thickness of about 0.1 mm and a height of about 6 mm, and wherein the system includes a plurality of self-adhesive low friction disks attaching the fiber cable to the spring (the disks being less than 0.250 mm thickness).

16. In a retractable/extendable device for fiber optic lines, a rotation buffering unit for providing a variable length section of fiber optic line enabling extension and retraction with optical continuity, as fiber optic line is unwound from or wound upon the device, comprising:

a body having a mandrel rotatable about a central axis, the mandrel having a radius from the central axis that is greater than a predetermined minimum bending radius for the optical fibers;

an interleaved spring/optical fiber structure disposed on the body about the mandrel, the spring comprising a strip of compliant material helically wound about a central axis, the strip having a height-to-thickness ratio selected to provide a height substantially greater than the optical fiber thickness, the thickness of the spring being proportioned to the height of the strip material and its elasticity, to provide torque and spring compliance in selected ranges, the structure also including at least one optical fiber positioned coextensively along the helical spring at an intermediate height region thereof, and being affixed thereto at spaced apart locations along its length, one end of the spring being fixed to the body and the other end being coupled to a fixed point at a greater radial distance from the central axis than the mandrel, the spring and interleaved fiber combination being radially and circumferentially movable between limits outside the mandrel, whereby rotation of a length of fiber optic line coupled to an end of the interleaved structure is accommodated by radial expansion or tightening of the helical spring and interleaved fiber between the two ends thereof.

17. A device as set forth in claim 16 above, wherein the spiral spring has a torque in the order of 3 inch-ounces, wherein the minimum fiber bend radius about the mandrel is in the range of 5 to 40 mm.

18. A device as set forth in claim 17 above, wherein a plurality of self-adhesive disks at spaced apart points along the length of fiber attach the fiber to the spiral spring, wherein the disks have low friction surfaces, wherein the spring strip is of stainless steel and has a height of approximately 6 mm and a thickness of approximately 0.125 mm, and wherein the fiber diameter is in the range from 0.250 mm to 0.9 mm.

19. A device as set forth in claim 16 above wherein the body has a low friction surface in contact with the interleaved structure, and the spring has an aspect ratio of height to thickness of about 50:1, the spring is of steel and the fiber is of about 0.250 mm diameter in the interleaved region.

20. A device for allowing bending of an optical fiber while maintaining more than a predetermined minimum allowable bending radius in the fiber between a pair of attachment points, comprising:

a flat spring member having a high cross-sectional aspect ratio of height to thickness, and an intermediate region along the height dimension of the cross-section, the spring member being curvilinear and continuous along its length with greater than the minimum bending radius between the pair of attachment points, and at least one optical fiber disposed along the length of the spring member and attached thereto at intermediate regions of the height of the spring member, and spaced therealong, the spacings being such that the fiber curves between the pair of attachment points are no less than the minimum allowable bending radius despite lengthwise changes in the curvilinear shape of the spring member.

21. A device as set forth in claim 20 above, wherein the one or more optical fibers bend relative to the height dimension of the spring member by less than half the height dimension of the cross-section of the spring member and the one or more optical fibers are affixed to the spring member with adhesive elements which have an outer facing layer with low friction characteristics.

22. A device as set forth in claim 21 above, wherein the spring member is configured to have a helical length changeable in average diameter between limits, wherein the device includes adhesive elements comprised of a self-adhesive material such as silicone and outer facing layer comprised of a plastic film such as fluoro-polymer for attaching the one or more fibers to the spring member and wherein the thickness of a spring member, and at least one fiber and attachment and low friction elements for each turn of the helix does not exceed about 1 mm.

* * * * *